United States Patent [19]
Yamamura et al.

[11] Patent Number: 5,317,417
[45] Date of Patent: May 31, 1994

[54] IMAGE PROCESSING APPARATUS WITH IMPROVED IMAGE REDUCTION

[75] Inventors: Katsumi Yamamura, Yokohama; Hideyuki Hanaoka, Kawasaki, both of Japan

[73] Assignee: Matsushita Graphic Communication Systems, Inc., Tokyo, Japan

[21] Appl. No.: 783,031

[22] Filed: Oct. 25, 1991

[30] Foreign Application Priority Data

Nov. 21, 1990 [JP] Japan .................. 2-319073
Mar. 4, 1991 [JP] Japan .................. 3-37255
May 28, 1991 [JP] Japan .................. 3-123483

[51] Int. Cl.$^5$ .................. H04N 7/12
[52] U.S. Cl. .................. 358/451; 358/429
[58] Field of Search .................. 358/429, 432–433, 358/451, 465–467; 382/56, 51

[56] References Cited

U.S. PATENT DOCUMENTS

| | | | |
|---|---|---|---|
| 4,124,870 | 11/1978 | Schatz et al. | 358/429 |
| 4,266,249 | 5/1981 | Chai et al. | 358/429 |
| 4,811,239 | 3/1989 | Tsao | 369/519 |
| 4,931,881 | 6/1990 | Matsui et al. | 358/466 |

FOREIGN PATENT DOCUMENTS

2196565 8/1990 Japan.

*Primary Examiner*—Stephen Brinnich
*Attorney, Agent, or Firm*—Lowe, Price, LeBlanc & Becker

[57] ABSTRACT

An image reducing apparatus includes a black-pixel counting section for counting a number of black pixels in an N×M-pixel area in an original image represented by white and black levels, where N and M denote predetermined integers equal to or greater than 2; a pattern comparing section for comparing a pixel pattern in the N×M-pixel area and an area surrounding the N×M-pixel area with predetermined reference patterns; and a level determining section for determining a level of a pixel in a reduction-resultant image in accordance with the black-pixel number counted by the black-pixel counting section and with a result of the pattern comparison by the pattern comparing section, the reduction-resultant image pixel corresponding to the N×M-pixel area in the original image.

10 Claims, 31 Drawing Sheets

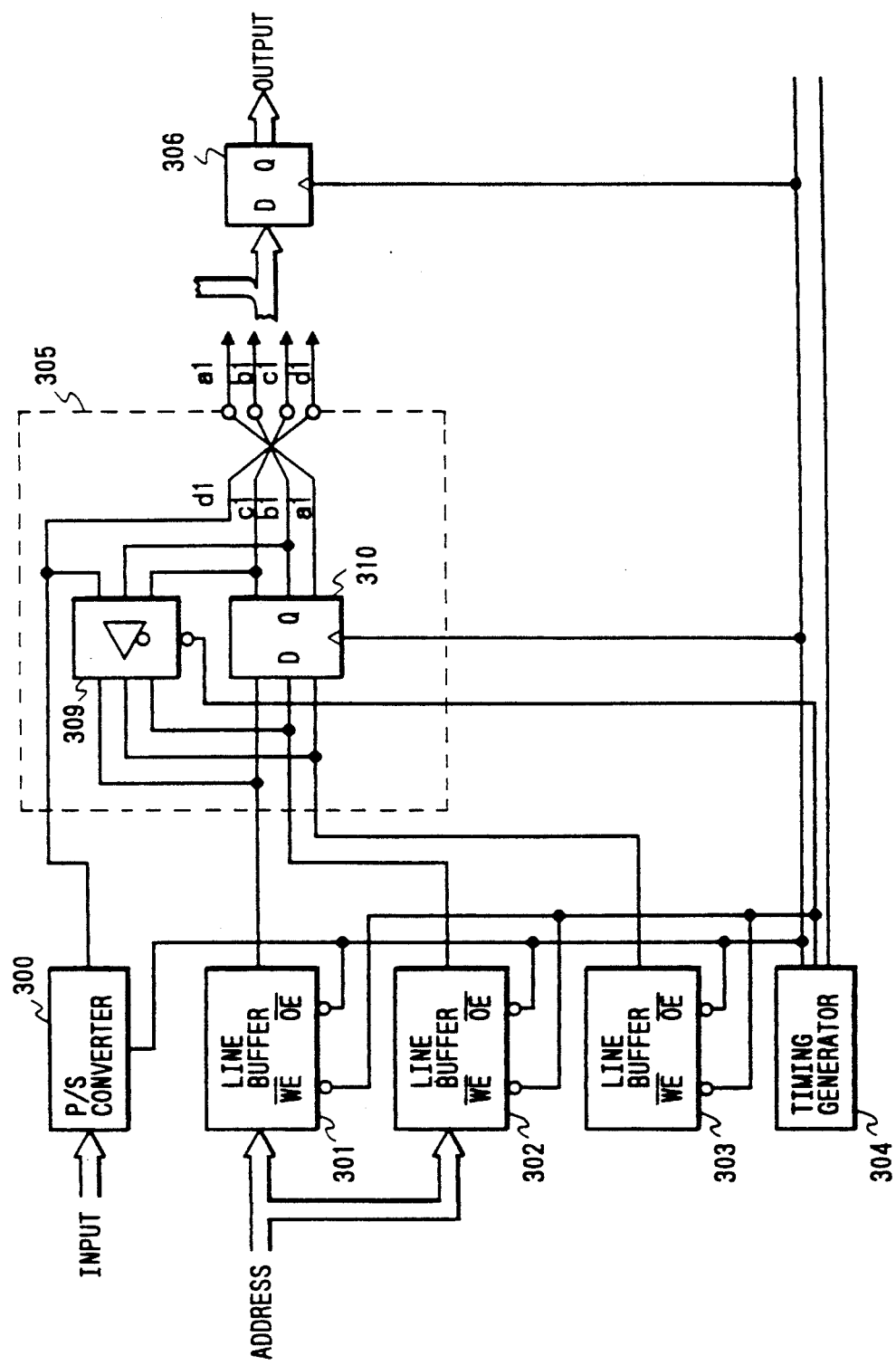

FIG. 4(a)

| a1 | a2 | a3 | a4 | a5 | ------ | an |
|----|----|----|----|----|--------|----|
| b1 | b2 | b3 | b4 | b5 | ------ | bn |
| c1 | c2 | c3 | c4 | c5 | ------ | cn |
| d1 | d2 | d3 | d4 | d5 | ------ | dn |
|    |    |    |    |    |        |    |
|    |    |    |    |    |        |    |
|    |    |    |    |    |        |    |

FIG. 4(b)

| c1 | c2 | c3 | c4 | ------ | cn | 301 |
|----|----|----|----|--------|----|----|

| b1 | b2 | b3 | b4 | ------ | bn | 302 |
|----|----|----|----|--------|----|----|

| a1 | a2 | a3 | a4 | ------ | an | 303 |
|----|----|----|----|--------|----|----|

FIG. 4(c)

| a1 | a2 | a3 | a4 |
|----|----|----|----|
| b1 | b2 | b3 | b4 |
| c1 | c2 | c3 | c4 |
| d1 | d2 | d3 | d4 |

FIG. 7(a)
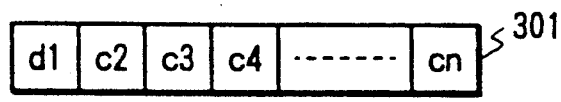
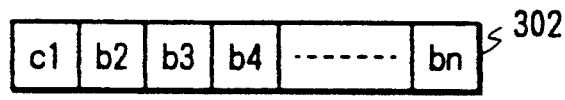
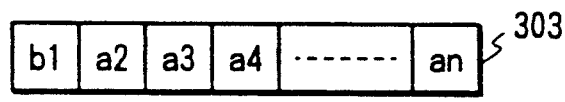
FIG. 7(b)
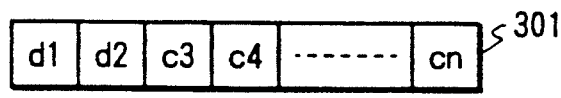
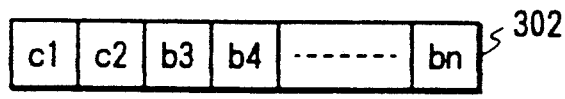
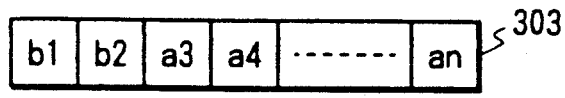
FIG. 7(c)
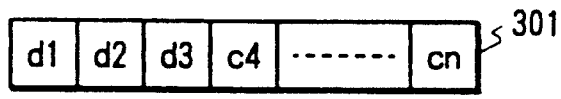
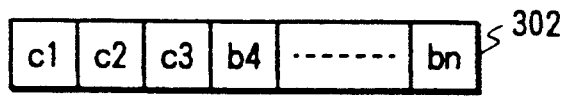
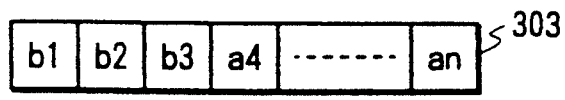

FIG. 8(a)
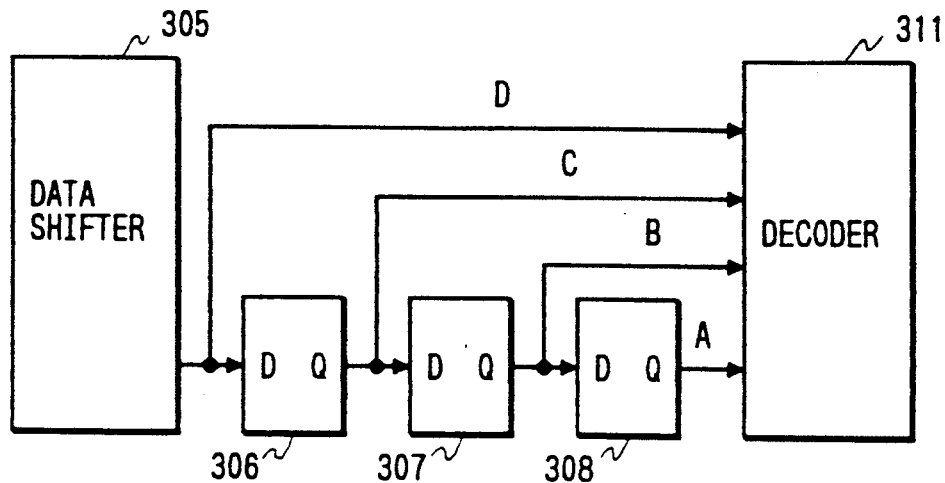
FIG. 8(b)
| A | B | C | D |
|---|---|---|---|
| a1 | a2 | a3 | a4 |
| b1 | b2 | b3 | b4 |
| c1 | c2 | c3 | c4 |
| d1 | d2 | d3 | d4 |
FIG. 9
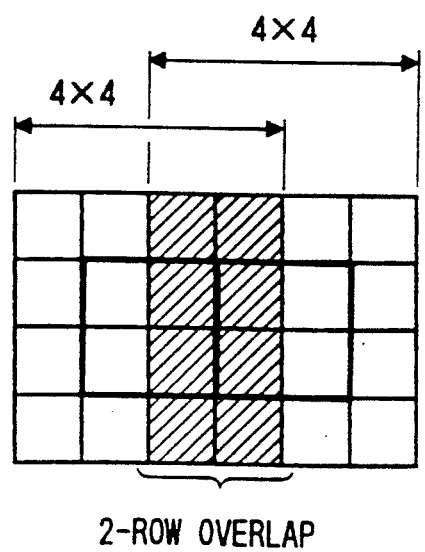
2-ROW OVERLAP

FIG. 12

| 16 | 5  | 6  | 7  |
|----|----|----|----|
| 15 | 1  | 2  | 8  |
| 14 | 4  | 3  | 9  |
| 13 | 12 | 11 | 10 |

FIG. 13

| BLACK PIXEL NUMBER | INPUT | | | | OUTPUT | |
|---|---|---|---|---|---|---|
| | 1 | 2 | 3 | 4 | C1 | C2 |
| 0 | L | L | L | L | L | L |
| 1 | H | L | L | L | L | 5+15 |
|   | L | H | L | L | L | $\overline{6}$ |
|   | L | L | L | H | L | $\overline{14}$ |
|   | L | L | H | L | L | H |
| 2 | H | H | L | L | L | $\overline{5 \cdot 6 \cdot 9 \cdot 10 \cdot 11}$ |
|   | H | L | L | H | L | $\overline{14 \cdot 15 \cdot 9 \cdot 10 \cdot 11}$ |
|   | H | L | H | L | L | H |
|   | L | H | L | H | L | H |
|   | L | H | H | L | 9·10·11 | $\overline{9 \cdot 10 \cdot 11}$ |
|   | L | L | H | H | 9·10·11 | $\overline{9 \cdot 10 \cdot 11}$ |
| 3 | H | H | L | H | H | L |
|   | H | H | H | L | H | L |
|   | H | L | H | H | H | L |
|   | L | H | H | H | H | L |
| 4 | H | H | H | H | H | H |

| BLACK PIXEL | N1 | N2 | N3 | N4 |
|---|---|---|---|---|
| A | #1 | #2 | #3 | #4 |
| B | #5 | #6 | #2 | #1 |
| C | #4 | #3 | #7 | #8 |
| D | #8 | #7 | #6 | #5 |

FIG. 26

| N1 | N2 | N3 | N4 | OUTPUT |
|----|----|----|----|--------|
| 0  | 0  | 0  | 0  | 0      |
| 0  | 0  | 0  | 1  | 0      |
| 0  | 0  | 1  | 0  | 0      |
| 0  | 0  | 1  | 1  | 0      |
| 0  | 1  | 0  | 0  | 0      |
| 0  | 1  | 0  | 1  | 1      |
| 0  | 1  | 1  | 0  | 1      |
| 0  | 1  | 1  | 1  | 0      |
| 1  | 0  | 0  | 0  | 0      |
| 1  | 0  | 0  | 1  | 1      |
| 1  | 0  | 1  | 0  | 0      |
| 1  | 0  | 1  | 1  | 0      |
| 1  | 1  | 0  | 0  | 0      |
| 1  | 1  | 0  | 1  | 0      |
| 1  | 1  | 1  | 0  | 0      |
| 1  | 1  | 1  | 1  | 0      |

BLACK
WHITE

BLACK
WHITE

BLACK
WHITE
GRAY

FIG. 32

| D1 | D2 | D3 |
|----|----|----|
| D4 | D5 | D6 |
| D7 | D8 | D9 |

FIG. 33

| DIRECTION IN PREDETERMINED-SIZE AREA | DIRECTION IN SURROUNDING AREA |
|---|---|
| Dir1 | Dir2 |
| Dir2 | Dir1 |
| Dir3 | Dir4 |
| Dir4 | Dir3 |
| Dir5 | Dir8 |
| Dir6 | Dir7 |
| Dir7 | Dir6 |
| Dir8 | Dir5 |

BLACK
WHITE

WHITE
GRAY

GRAY
WHITE

| BLACK PIXEL NUMBER | INPUT | | | OUTPUT | |
|---|---|---|---|---|---|
| | A | B | C | C1 | C2 |
| 0 | X | X | X | L | L |
| 1 | X | X | L | L | H |
| | X | X | H | L | L |
| 2 | L | L | X | L | H |
| | X | H | X | L | L |
| | H | X | X | H | L |
| 3 | X | X | X | H | L |
| 4 | X | X | X | H | H |

X : DON'T CARE

IMAGE PROCESSING APPARATUS WITH IMPROVED IMAGE REDUCTION

BACKGROUND OF THE INVENTION

1. Field of the Invention

This invention relates to an image processing apparatus such as an apparatus for reducing a bi-level image or an image represented by two different levels, for example, black and white levels.

2. Description of the Prior Art

There are two general methods of reducing a bi-level image, that is, a simple thinning-out method and a decision-by-majority method. According to the simple thinning-out method, pixels of an original image which are spaced at predetermined equal intervals are selected as effective pixels for a reduction-resultant image, and the other pixels are ignored. According to the decision-by-majority method, an original image is divided into local areas, and the level of a pixel of a reduction-resultant image which corresponds to a local area in the original image is determined in accordance with the number of black pixels within the local area.

In the decision-by-majority method, a small black point and a thin black line in an original image tend to be omitted from a reduction-resultant image. Thus, the quality of a reduction-resultant image is low for an original image which has many small black points and thin black lines. Furthermore, in the decision-by-majority method, the density of black pixels in a reduction-resultant image tends to be higher than that in an original image, and a fine-pattern part of the original image may be inaccurately reduced.

Also in the simple thinning-out method, a small black point and a thin black line in an original image tend to be omitted from a reduction-resultant image.

SUMMARY OF THE INVENTION

It is an object of this invention to provide an improved image processing apparatus.

A first aspect of this invention provides an image reducing apparatus comprising black-pixel counting means for counting a number of black pixels in an N×M-pixel area in an original image represented by white and black levels, where N and M denote predetermined integers equal to or greater than 2; pattern comparing means for comparing a pixel pattern in the N×M-pixel area and an area surrounding the N×M-pixel area with predetermined reference patterns; and level determining means for determining a level of a pixel in a reduction-resultant image in accordance with the black-pixel number counted by the black-pixel counting means and with a result of the pattern comparison by the pattern comparing means, the reduction-resultant image pixel corresponding to the N×M-pixel area in the original image.

A second aspect of this invention provides an image reducing apparatus comprising black-pixel counting means for counting a number of black pixels in an N×M-pixel area in an original image represented by white and black levels, where N and M denote predetermined integers equal to or greater than 2; connection-direction extracting means for extracting a direction of a connection of black pixels in the N×M-pixel area, and a direction of a connection of black pixels in an area surrounding the N×M-pixel area; black-pixel connection judging means for judging a relation between the direction of the connection of the black pixels in the N×M-pixel area and the direction of the connection of the black pixels in the surrounding area which are extracted by the connection-direction extracting means; and level determining means for determining a level of a pixel in a reduction-resultant image in accordance with the black-pixel number counted by the black-pixel counting means and with a result of the relation judgement by the black-pixel connection judging means, the reduction-resultant image pixel corresponding to the N×M-pixel area in the original image.

A third aspect of this invention provides an image processing apparatus comprising means for generating data of a pixel in a first-type frame and data of a pixel in a second-type frame, wherein a position of the pixel in the first-type frame corresponds to a position of the pixel in the second-type frame; means for indicating the data of the pixel in the first-type frame during a first frame period, indicating the data of the pixel in the first-type frame during a second frame period following the first frame period, and indicating the data of the pixel in the second-type frame during a third frame period following the second frame period; means for setting both of the data of the pixel in the first-type frame and the data of the pixel in the second-type frame to a white level when a white pixel is required to be indicated by the indicating means; means for setting the data of the pixel in the first-type frame and the data of the pixel in the second-type frame to the white level and a black level respectively when a light gray pixel is required to be indicated by the indicating means; means for setting the data of the pixel in the first-type frame and the data of the pixel in the second-type frame to the black level and the white level respectively when a dark gray pixel is required to be indicated by the indicating means; and means for setting both of the data of the pixel in the first-type frame and the data of the pixel in the second-type frame to the black level when a black pixel is required to be indicated by the indicating means.

A fourth aspect of this invention provides an image reducing apparatus comprising black-pixel counting means for counting a number of black pixels in an N×M-pixel area in an original image represented by white and black levels, where N and M denote predetermined integers equal to or greater than 2; pattern comparing means for comparing a pixel pattern in the N×M-pixel area and an area surrounding the N×M-pixel area with predetermined reference patterns; first level determining means for determining a level of a pixel in a first-type frame of a reduction-resultant image in accordance with the black-pixel number counted by the black-pixel counting means and with a result of the pattern comparison by the pattern comparing means, the reduction-resultant image pixel corresponding to the N×M-pixel area in the original image; second level determining means for determining a level of a pixel in a second-type frame of the reduction-resultant image in accordance with the black-pixel number counted by the black-pixel counting means and with the result of the pattern comparison by the pattern comparing means, wherein a position of the pixel in the first-type frame corresponds to a position of the pixel in the second-type frame; and means for indicating the data of the pixel in the first-type frame during a first frame period, indicating the data of the pixel in the first-type frame during a second frame period following the first frame period, and indicating the data of the pixel in the second-type frame during a third frame period following the second frame period; wherein the first and second level determining means comprises means for setting both of the data of the pixel in the first-type frame and the data of the pixel in the second-type frame to a white level when a white pixel is required to be indicated by the indicating means; means for setting the data of the pixel in the first-type frame and the data of the pixel in the second-type frame to the white level and a black level respectively when a light gray pixel is required to be indicated by the indicating means; means for setting the data of the pixel in the first-type frame and the data of the pixel in the second-type frame to the black level and the white level respectively when a dark gray pixel is required to be indicated by the indicating means; and means for setting both of the data of the pixel in the first-type frame and the data of the pixel in the second-type frame to the black level when a black pixel is required to be indicated by the indicating means.

BRIEF DESCRIPTION OF THE DRAWINGS

FIG. 3 is a block diagram of a portion of the image reducing apparatus of FIG. 1.

FIG. 4(a) is a diagram showing the arrangement of pixel data of an original image.

FIG. 4(b) is a diagram showing the arrangements of pixel data in the line buffers of FIGS. 2 and 3.

FIG. 4(c) is a diagram showing the arrangement of pixel data of a predetermined-size area in the original image and an area surrounding the former area.

FIGS. 7(a)–7(c) are diagrams showing the flow of pixel data in the line buffers of FIGS. 2 and 3.

FIG. 8(a) is a block diagram of a portion of the image reducing apparatus of FIG. 1.

FIG. 8(b) is a diagram showing the arrangement of pixel data represented by signals in the circuit of FIG. 8(a).

FIG. 9 is a diagram showing a unit size of the data processing executed by the decoder of FIGS. 2 and 8(b).

FIG. 12 is a diagram showing the conditions of numbering the pixels in the predetermined-size area and the surrounding area.

FIG. 13 is a diagram showing the relation between input data and output data which is determined by a decoding process in the image reducing apparatus of FIG. 1.

FIG. 24 is a diagram showing the relation between pixels in a predetermined size area and an area surrounding the former area, and characters denoting the pixels.

FIG. 25 is a diagram showing the relation between the position of a black pixel and pixels in the surrounding area which are used in the data processing by the image reducing apparatus of FIG. 23.

FIG. 26 is a diagram showing the relation between input data and output data which is determined by a decoding process in the image reducing apparatus of FIG. 23.

FIG. 32 is a diagram showing the relation between pixels in a predetermined-size area in an original image, and characters denoting the pixels.

FIG. 33 is a diagram showing the relation between a pixel direction in the predetermined-size area and a pixel direction in an area surrounding the former area.

DESCRIPTION OF THE FIRST PREFERRED EMBODIMENT

Figure 1:
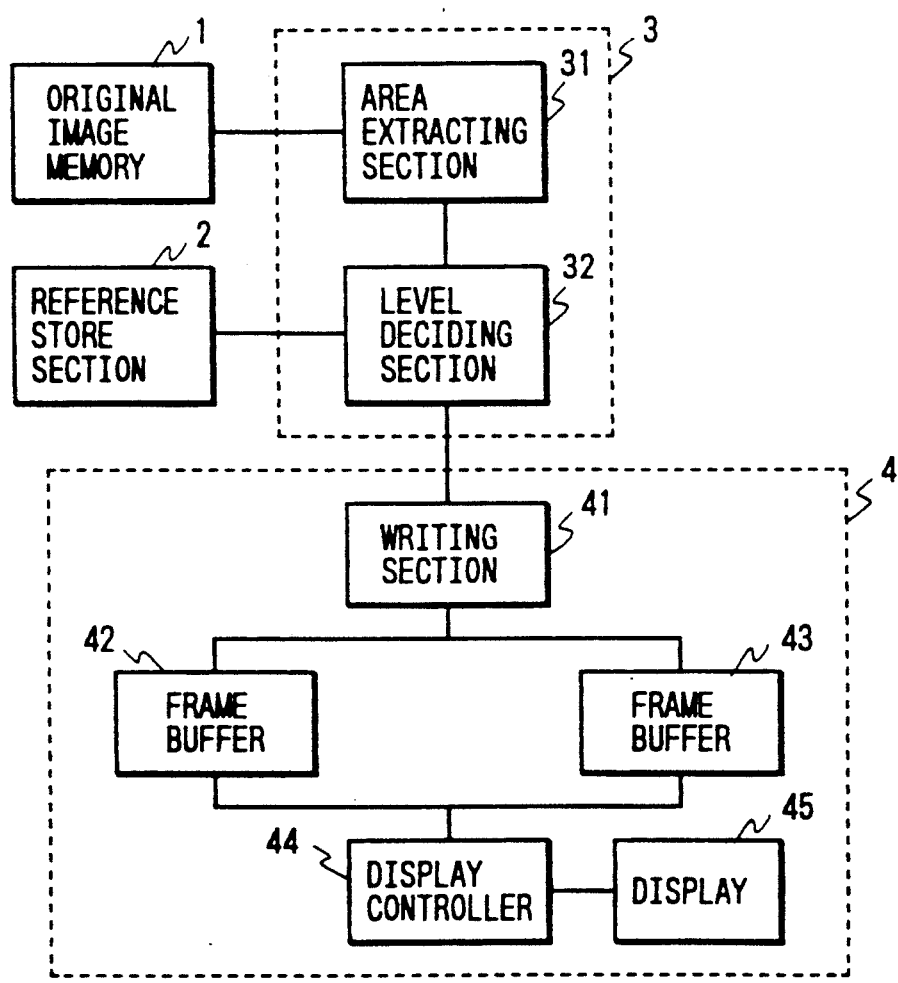
FIG. 1 is a block diagram of an image reducing apparatus according to a first embodiment of this invention.

With reference to FIG. 1, an image reducing apparatus includes a memory 1, a store section 2, a decision block 3, and a processing block 4.

The memory 1 stores information or data representing a bi-level (black/white-level) original image. Since the original image is represented by black and white levels, each pixel of the original image is represented by a 1-bit data. The original image information is generally inputted via a suitable device such as an image scanner.

The store section 2 includes a suitable memory which stores information or data representing predetermined pixel patterns and predetermined references for the decision of the level of each pixel of a reduction-resultant image.

The decision block 3 includes an extracting section 31 and a deciding section 32. The extracting section 31 receives the original image information from the original image memory 1. The extracting section 31 serves to extract a predetermined-size area (region) and an area surrounding the former area from the original image. As will be made clear later, each predetermined-size area is reduced to a pixel of a reduction-resultant image. In addition, each combination of the predetermined-size area and the surrounding area corresponds to a unit-area of data processing. The extracted predetermined-size area has N×M pixels, where N and M denote predetermined integers equal to or greater than 2. It should be noted that the original image is divided into a plurality of equal-size areas which are sequentially extracted by the extracting section 31. The deciding section 32 receives the information from the store section 2 which represents the predetermined pixel patterns and the predetermined references. In addition, the deciding section 32 receives output data from the extracting section 31 which represents the extracted N×M-pixel area and the surrounding area. The deciding section 32 serves to decide the tone level of a resultant-image pixel (a reduced-image pixel), which corresponds to the extracted N×M-pixel area of the original image, on the basis of the number of black pixels in the N×M pixel area by referring to the predetermined pixel patterns, the predetermined references, and the surrounding area. Specifically, the deciding section 32 reduces the N×M-pixel area of the original image to first-frame pixel data and second-frame pixel data of a reduction-resultant image in accordance with the states of the pixels in the N×M-pixel area and with the states of the pixels in the related surrounding area.

The processing block 4 includes a data writing section 41, a first frame buffer 42, a second frame buffer 43, a display controller 44, and a display 45. The data writing section 41 receives the tone-level information, that is, the first-frame pixel data and the second-frame pixel data, from the deciding section 32 of the decision block 3. The data writing section 41 stores the first-frame pixel data into the first frame buffer 42, and stores the second-frame pixel data into the second frame buffer 43. The display controller 44 periodically changes the first frame buffer 42 and the second frame buffer 43 in response to a frame signal. Specifically, the display controller 44 sequentially reads out the first-frame pixel data from the first frame buffer 42 during first and second frame periods, fourth and fifth frame periods, seventh and eighth frame periods, .... The display controller 44 sequentially reads out the second-frame pixel data from the second frame buffer 43 during a third frame period, a sixth frame period, .... The readout data are transmitted to the display 45, being indicated by the display 45 as a reproduced image which agrees with a reduction of the original image.

Figure 2:
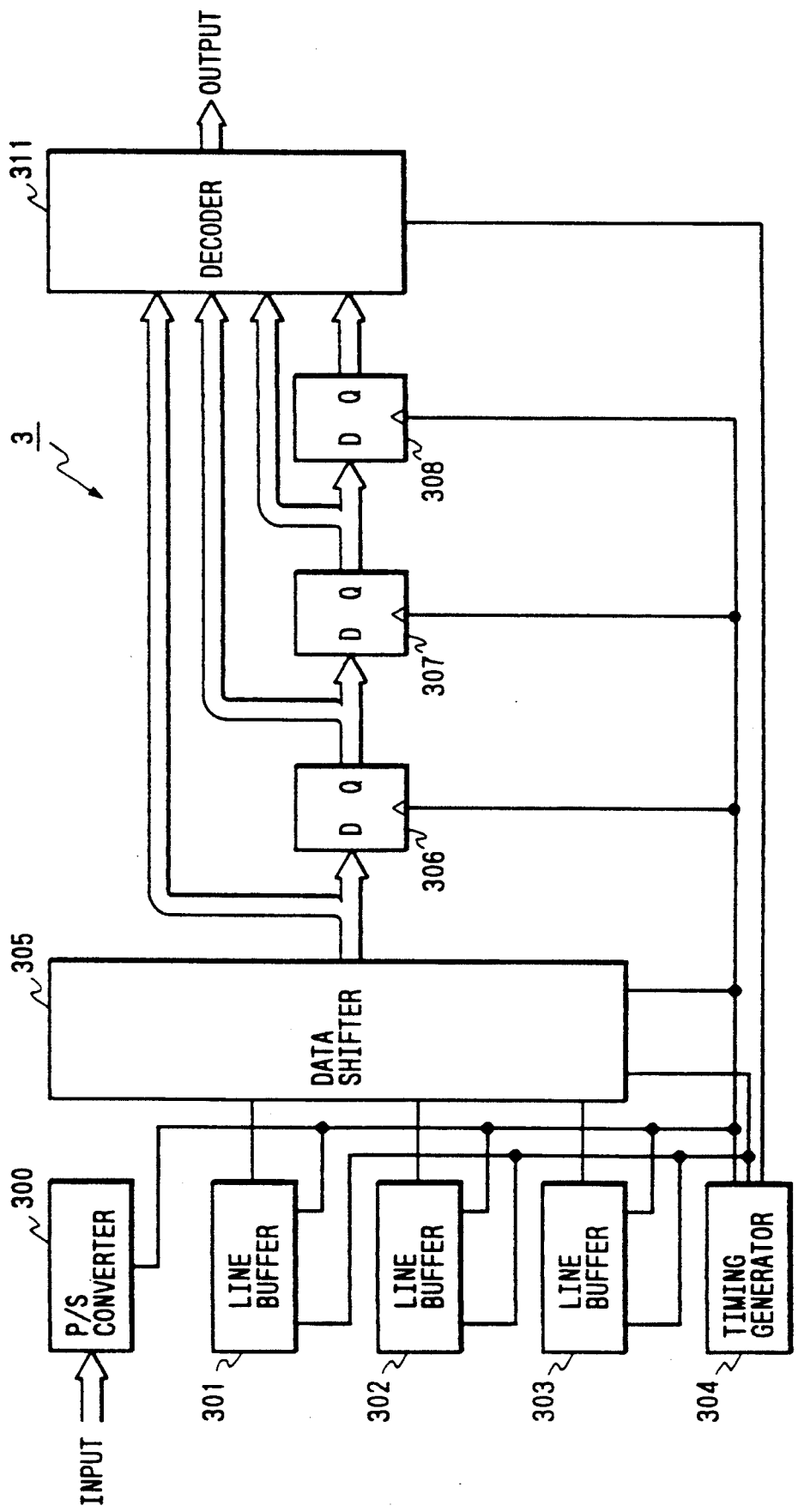
FIG. 2 is a block diagram of a portion of the image reducing apparatus of FIG. 1.

FIG. 2 shows the details of the decision block 2 which is designed for N and M equal to 2. As shown in FIG. 2, the decision block 2 includes a parallel-to-serial (P/S) converter 300, line buffers 301-303, a timing signal generator 304, a data shifter 305, flip-flops 306-308, and a decoder 311. The timing signal generator 304 outputs timing signals to the devices 300-303, 305-308, and 311. The devices 300-303, and 305-308 compose the extracting section 31 (see FIG. 1). The decoder 311 corresponds to the deciding section 32 (see FIG. 1). Also, the decoder 311 corresponds to the store section 2 (see FIG. 1).

The original-image data are sequentially read out from the memory 1 (see FIG. 1) 8 bits by 8 bits, so that a sequence of 8-bit original-image parallel data is generated. The P/S converter 300 receives the 8-bit original-image parallel data into corresponding original-image serial data. Each of the line buffers 301-303 serves to store an amount of original-image pixel data which corresponds to one horizontal line.

The data shifter 305 receives the original-image serial data from the P/S converter 300, and transfers the received original-image serial data to the line buffer 301. In addition, the data shifter 305 transfers the original-image serial data from the line buffer 301 to the line buffer 302, and transfers the original-image serial data from the line buffer 302 to the line buffer 303. At a given timing, three sets of the original-image data which correspond to three successive lines are stored in the line buffers 301-303 respectively. The data shifter 305 compose 4-bit original-image parallel data from the original-image serial data outputted by the P/S converter 300 and the line buffers 301-303. The data shifter 305 outputs the 4-bit original-image parallel data to the flip-flop 306 and the decoder 311.

The flip-flops 306-308 are connected in series. The 4-bit original-image parallel data outputted from the data shifter 305 is sampled and held by the first flip-flop 306 in response to a clock signal fed from the timing signal generator 304. The first flip-flop 306 outputs the 4-bit original-image parallel data to the second flip-flop 307 and the decoder 311. The 4-bit original-image parallel data outputted from the first flip-flop 306 is sampled and held by the second flip-flop 307 in response to the clock signal fed from the timing signal generator 304. The second flip-flop 307 outputs the 4-bit original-image parallel data to the third flip-flop 308 and the decoder 311. The 4-bit original-image parallel data outputted from the second flip-flop 307 is sampled and held by the third flip-flop 308 in response to the clock signal fed from the timing signal generator 304. The third flip-flop 307 outputs the 4-bit original-image parallel data to the decoder 311. The flip-flops 306-308 cooperate to shift the 4-bit original-image data in response to the clock signal.

As shown in FIG. 3, the data shifter 305 includes a tri-state buffer 309 and a flip-flop 310 which operate in response to clock signals fed from the timing signal generator 304. The output terminal of the P/S converter 300 is connected to a first input terminal of the tri-state buffer 309 and also a fourth output terminal of the data shifter 305. A second input terminal of the tri-state buffer 309 is connected to a second output terminal of the flip-flop 310. A third input terminal of the tri-state buffer 309 is connected to a first output terminal of the flip-flop 310. A first output terminal of the tri-state buffer 309 which relates to the first input terminal thereof is connected to the line buffer 301. A second output terminal of the tri-state buffer 309 which relates to the second input terminal thereof is connected to the line buffer 303. A third output terminal of the tri-state buffer 309 which relates to the third input terminal thereof is connected to the line buffer 302. The line buffers 301, 302, and 303 are connected to first, second, and third input terminals of the flip-flop 310 which relate to the first, second, and third output terminals thereof respectively. The first output terminal of the flip-flop 310 is connected to a third output terminal of the data shifter 305. The second output terminal of the flip-flop 310 is connected to a second output terminal of the data shifter 305. The third output terminal of the flip-flop 310 is connected to a first output terminal of the data shifter 305. The line buffers 301-303 receive address signals from an address generator (not shown). Writing and reading data into and from the line buffers 301-303 are controlled in response to clock signals fed from the timing signal generator 304.

As shown in FIG. 4(a), the original-image data stored in the memory 1 has a matrix arrangement of pixel data a1-an, b1-bn, c1-cn, d1-dn, .... As shown in FIG. 4(b), the original-image pixel data corresponding to three successive lines are stored in the line buffers 301-303 respectively. As shown in FIG. 4(c), a 2×2-pixel area (a predetermined-size area) is surrounded by 12 pixels which compose a surrounding area.

Figure 5:
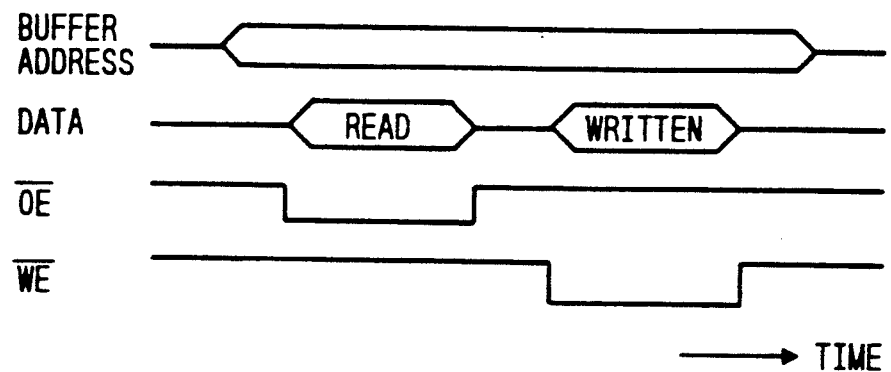
FIG. 5 is a timing chart showing the timing relations among signals in the circuit of FIG. 3.

Each of the line buffers 301-303 has control terminals WE and OE subjected to clock signals outputted from the timing signal generator 304. As shown in FIG. 5, during a period where the line buffer 301, 302, or 303 continues to receive an address signal, writing data into the line buffer is executed when its control terminal WE receives a low level of a first clock signal, and reading data from the line buffer is executed when its control terminal OE receives a low level of a second clock signal.

Figure 6:
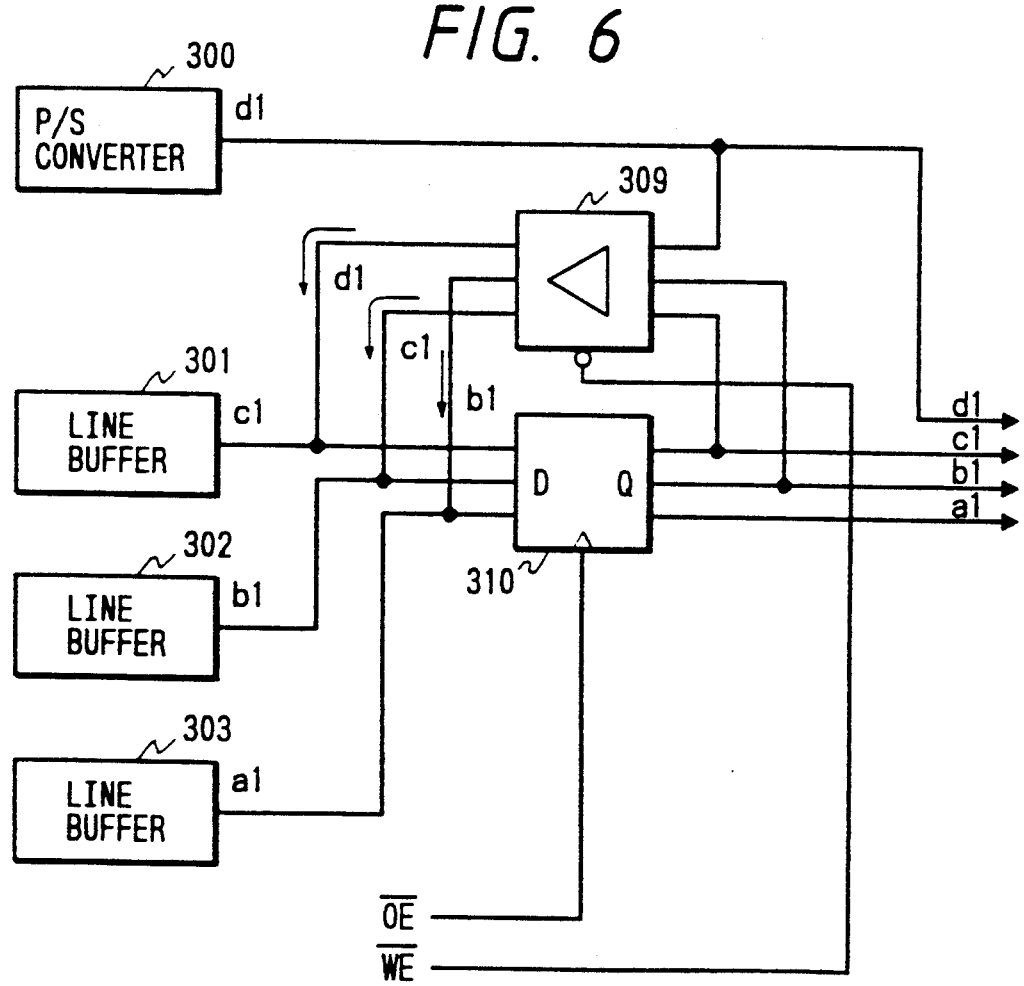
FIG. 6 is a block diagram of a portion of the circuit of FIG. 3.

As shown in FIG. 6, pixel data d1 outputted from the P/S converter 300 is written into the line memory 301 via the tri-state buffer 309. Pixel data b1 outputted from the line buffer 302 is written into the line buffer 303 via the flip-flop 310 and the tri-state buffer 309.

FIG. 7(a) shows contents of pixel data in the line buffers 301-303 at a given stage. When the line buffers 301-303 are subjected to a data writing process, the line buffers 301-303 change from the states of FIG. 7(a) to states of FIG. 7(b). When the line buffers 301-303 are subjected to a subsequent data writing process, the line buffers 301-303 change from the states of FIG. 7(b) to states of FIG. 7(c). Such operation steps are periodically reiterated so that the 1-line amount of the pixel data c1-cn, the 1-line amount of the pixel data b1-bn, and the 1-line amount of the pixel data a1-an are replaced by the 1-line amount of the pixel data d1-dn, the 1-line amount of the pixel data c1-cn, and the 1-line amount of the pixel data b1-bn in the line buffers 301, 302, and 303 respectively.

As shown in FIGS. 3 and 6, the pixel data d1 outputted from the P/S converter 300, the pixel data c1 read out from the line buffer 301, the pixel data b1 read out from the line buffer 302, and the pixel data a1 read out from the line buffer 303 compose 4-bit parallel data which are outputted from the data shifter 305.

As shown in FIG. 8(a), the decoder 311 receives the 4-bit parallel data A, B, C, and D from the flip-flop 308, the flip-flop 307, the flip-flop 306, and the data shifter 305 respectively. As shown in FIG. 8(b), the 4-bit parallel data A has the four pixel data a1-d1. The 4-bit parallel data B has the four pixel data a2-d2. The 4-bit parallel data C has the four pixel data a3-d3. The 4-bit parallel data D has the four pixel data a4-d4. In this way, the decoder 311 simultaneously receives a set of the 4×4-bit data, that is, a set of the 4×4-pixel data, in four successive lines and four successive rows. A set of the 4×4-bit data is composed of the 2×2-bit predetermined-size data and the 12-bit surrounding data. The decoder 311 executes a level decision process for each pixel of a reduction-resultant image (a reduced image) in response to the received 4×4-bit data, that is, the 4×4-pixel data. Specifically, the decoder 311 reduces the 2×2-bit input data into first-frame output pixel data and second-frame output pixel data in accordance with the states of the pixels in the 2×2-pixel area and the surrounding area, that is, in accordance with the states of the 4×4-bit input data. As shown in FIG. 9, a set of the 4×4-bit data overlaps a subsequent set of the 4×4-bit data by two rows. Thus, the level decision process is reiterated at a period corresponding to the period of inputting the 4×2-bit data.

Figure 10:
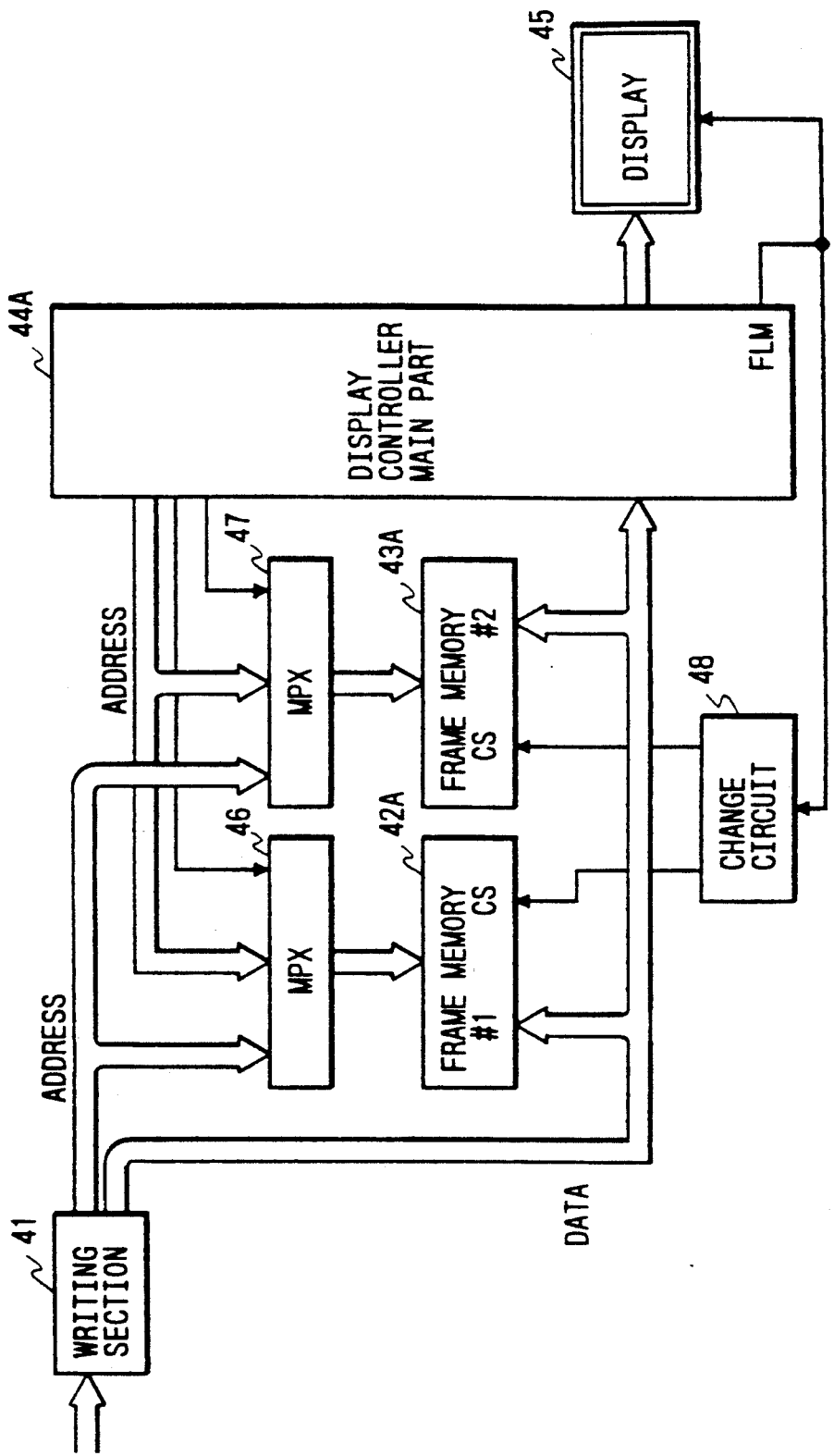
FIG. 10 is a block diagram of a portion of the image reducing apparatus of FIG. 1.

As shown in FIG. 10, a first frame memory 42A is connected to a multiplexer 46. The first frame memory 42A and the multiplexer 46 compose the first frame buffer 42 (see FIG. 1). A second frame memory 43A is connected to a multiplexer 47. The second frame memory 43A and the multiplexer 47 compose the second frame buffer 43 (see FIG. 1). As described previously, the data writing section 41 receives the tone-level information, that is, the first-frame pixel data and the second-frame pixel data, from the deciding section 32 of the decision block 3 (see FIG. 1). The data writing section 41 stores the first-frame pixel data into the first frame memory 42A, and stores the second-frame pixel data into the second frame memory 43A. During this data storing process, the data writing section 41 feeds an address signal to the frame memories 42A and 43A via the multiplexers 46 and 47, and each pixel data of the first frame and each pixel data of the second frame are stored into storage locations of the frame memories 42A and 43A which are designated by the address signal.

Figure 11:
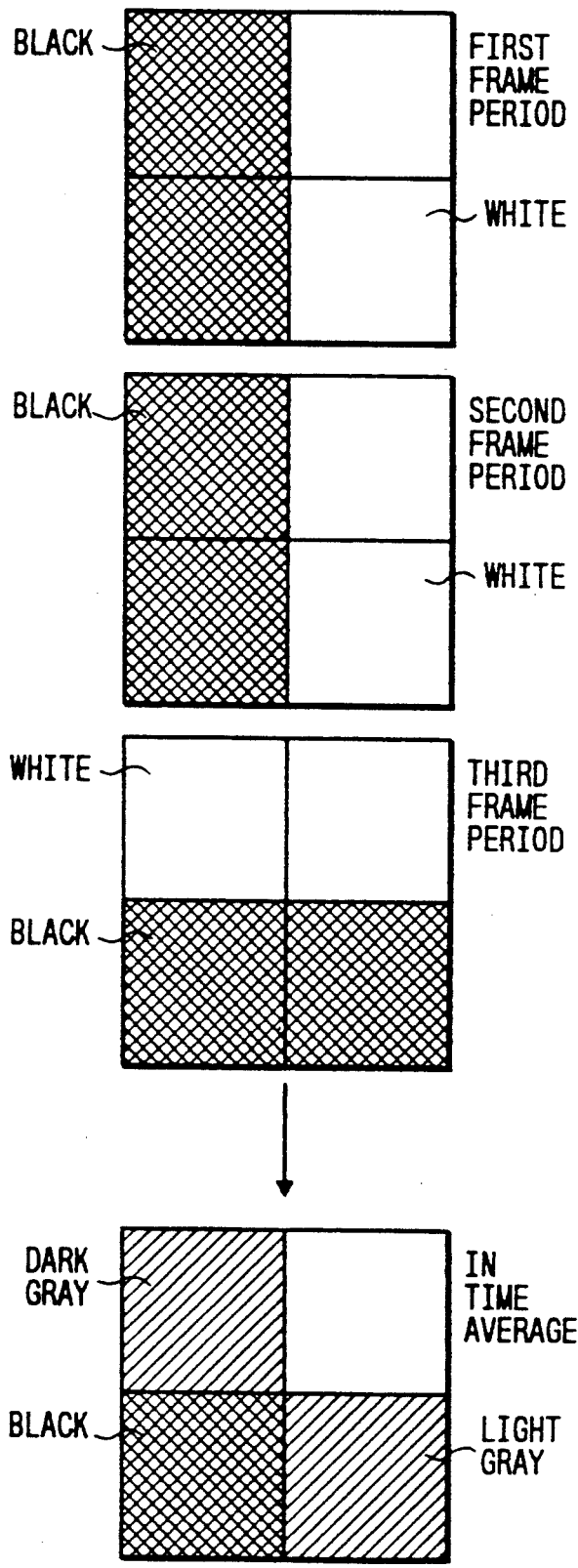
FIG. 11 is a diagram showing a frame-dependent indication process in the image reducing apparatus of FIG. 1.

A display controller main part 44A and a buffer change circuit 48 compose the display controller 44 (see FIG. 1). The display controller main part 44A outputs an address signal to the multiplexers 46 and 47. Each of the multiplexers 46 and 47 selects one of the output address signal from the data writing section 41 and the output address signal from the display controller main section 44A in response to an output control signal from the display controller main part 44A, and transmits the selected address signal to the frame memory 42A or 43A. During a data readout process, the buffer change circuit 48 selects and activates one of the frame memories 42A and 43A in response to a frame signal fed from the display controller main part 44A. Specifically, during a first frame interval, the pixel data (the first-frame pixel data) are sequentially read out from the first frame memory 42A in response to the output address signal from the display controller main part 44A. During a second frame interval, the pixel data (the first-frame pixel data) are sequentially read out from the first frame memory 42A in response to the output address signal from the display controller main section 44A. During a third frame interval, the pixel data (the second-frame pixel data) are sequentially read out from the second frame memory 43A in response to the output address signal from the display controller main section 44A. The data readout processes in the first, second, and third frame intervals are executed as illustrated in FIG. 11. A sequence of the data readout processes in the first, second, and third frame intervals is periodically executed. In this way, a data readout process is periodically performed at a predetermined frequency, which is preferably equal to 100 Hz or higher (corresponding to a period of 10 msec or less) for the prevention of a flicker of a reproduced image. The readout pixel data are fed to the display controller main part 44A, being converted into a video signal of a given format. The video signal is outputted from the display controller main part 44A to the display 45, being visualized by the display 45 as a reproduced image which agrees with a reduction of the original image.

As understood from the previous description, for a common pixel of the reduction-resultant image, the frequency of the indication of the first-frame pixel data is equal to twice the frequency of the indication of the second-frame pixel data. Thus, in the case where the first-frame pixel data corresponds to the black level but the second-frame pixel data corresponds to the white level, the related pixel of the reduction-resultant image is reproduced as a dark gray pixel from the standpoint of time average. In the case where the first-frame pixel data corresponds to the white level but the second-frame pixel data corresponds to the black level, the related pixel of the reduction-resultant image is reproduced as a light gray pixel from the standpoint of time average. In the case where both the first-frame pixel data and the second-frame pixel data correspond to the white level, the related pixel of the reduction-resultant image is reproduced as a white pixel. In the case where both the first-frame pixel data and the second-frame pixel data correspond to the black level, the related pixel of the reduction-resultant image is reproduced as a black pixel. Therefore, in the embodiment of this invention, the tone of a pixel of the reduction-resultant image is changeable among four different levels, that is, the black level, the dark gray level, the light gray level, and the white level.

A description will now be given of the operation of the store section 2 and the deciding section 32 of the decision block 3. The store section 2 and the deciding section 32 are formed by the decoder 311. As shown in FIG. 12, the 4×4-pixel data received by the deciding section 32 are numbered from "1" to "16". The left upper pixel data in the central 2×2-pixel area is assigned to the number "1". The numbers "2"–"4" are sequentially given to the remaining pixel data in the central 2×2-pixel area in the clockwise direction. The pixel data directly above the pixel data "1" is assigned to the number "5". The numbers "6"–"16" are sequentially given to the remaining pixel data in the clockwise direction.

FIG. 13 shows the relation between 2×2-pixel input data and 2-bit output data which is determined by the predetermined references represented by the information held in the store section 2. A first bit of the 2-bit output data corresponds to the first-frame pixel data outputted from the decoder 311, and a second bit of the 2-bit output data corresponds to the second-frame pixel data outputted from the decoder 311. While the input data represents a part of the original image, the output data represents a part of a reduction-resultant image. In FIG. 13, the pixels of the 2×2-pixel input data are identified by the numbers "1"–"4" (see FIG. 12) respectively, and the bits of the 2-bit output data (the first-frame output pixel data and the second-frame output pixel data) are denoted by the characters C1 and C2 respectively. In FIG. 13, the letter L denotes pixel data corresponding to the white level, and the character H denotes pixel data corresponding to the black level. Furthermore, the output pixel data C1 and C2 being L and L correspond to a white level. The output pixel data C1 and C2 being L and H correspond to a light gray level. The output pixel data C1 and C2 being H and L correspond to a dark gray level. The output pixel data C1 and C2 being H and H correspond to a black level. In FIG. 13, the character 6 with an overhead line denotes an inversion of the input pixel data "6". Thus, the character 6 with the overhead line corresponds to L and H when the input pixel data "6" is H and L respectively. The character 5+15 with an overhead line denotes an inversion of the result of OR operation between the input pixel data "5" and the input pixel data "15". For example, the character 5+15 with the overhead line corresponds to L when the input pixel data "5" and the input pixel data "15" are L and H respectively. The character 9.10.11 denotes the result of AND operation between the input pixel data "9", the input pixel data "10", and the input pixel data "11". For example, the character 9.10.11 corresponds to L when the input pixel data "9", the input pixel data "10", and the input pixel data "11" are H, L, and L respectively. The character 9.10.11 with an overhead line denotes an inversion of the result of AND operation between the input pixel data "9", the input pixel data "10", and the input pixel data "11". For example, the character 9.10.11 with the overhead line corresponds to H when the input pixel data "9", the input pixel data "10", and the input pixel data "11" are H, L, and L respectively. The character 5.6.9.10.11 with overhead lines denotes an inversion of the result of AND operation between the input pixel data "5", the input pixel data "6", an inversion of the input pixel data "9", an inversion of the input pixel data "10", and an inversion of the input pixel data "11". For example, the character 5.6.9.10.11 with the overhead lines corresponds to L when the input pixel data "5", the input pixel data "6", the input pixel data "9", the input pixel data "10", and the input pixel data "11" are H, H, L, L, and L respectively. The character 14.15.9.10.11 with overhead lines denotes an inversion of the result of AND operation between the input pixel data "14", the input pixel data "15", an inversion of the input pixel data "9", an inversion of the input pixel data "10", and an inversion of the input pixel data "11". For example, the character 14.15.9.10.11 with the overhead lines corresponds to L when the input pixel data "14", the input pixel data "15", the input pixel data "9", the input pixel data "10", and the input pixel data "11" are H, H, L, L, and L respectively.

Figure 14A:
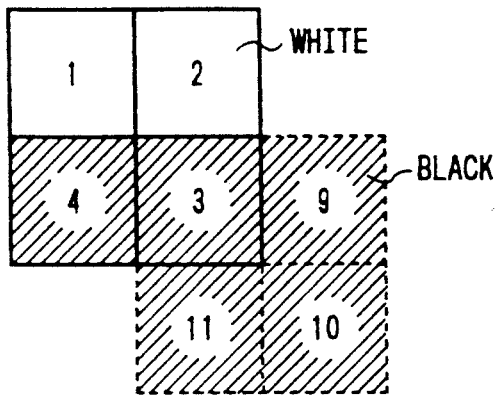
FIGS. 14(a)–16(b) are diagrams showing predetermined reference patterns used in the image reducing apparatus of FIG. 1.
Figure 14B:
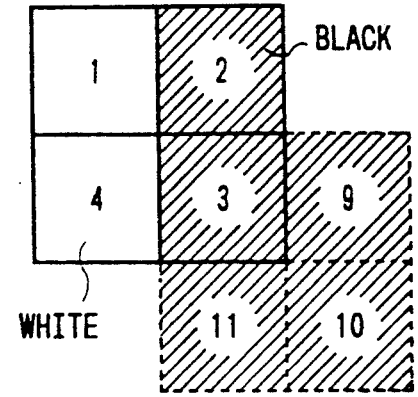
Figure 15A:
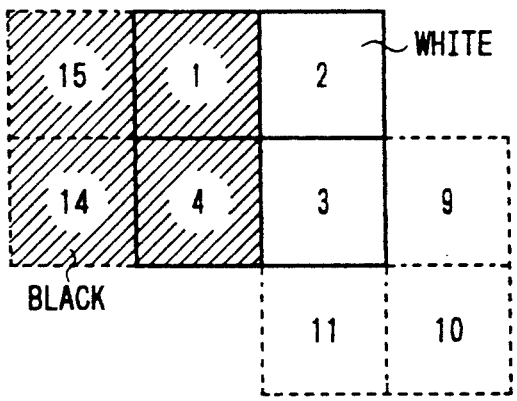
Figure 15B:
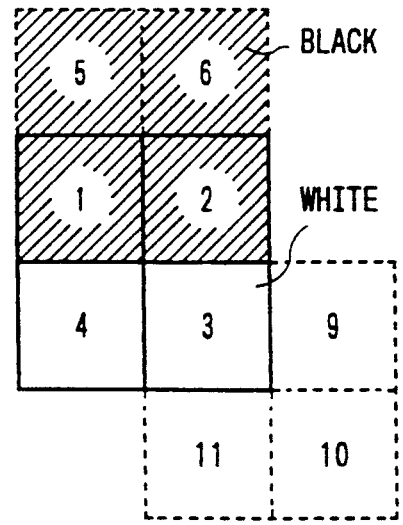
Figure 16A:
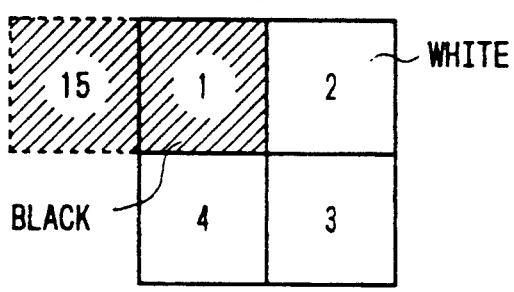
Figure 16B:
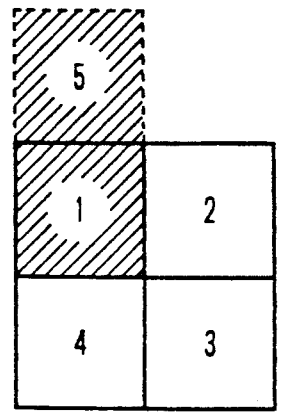
Figure 16C:
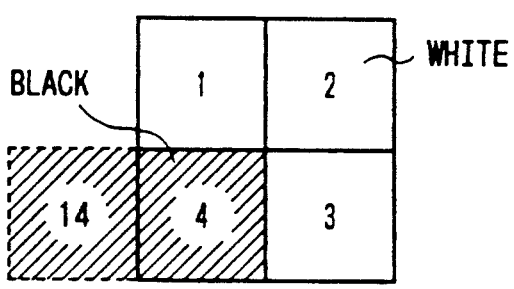
Figure 16D:
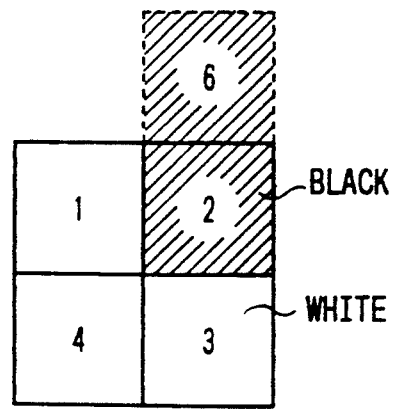

FIGS. 14, 15, and 16 shows first, second, third, fourth, fifth, sixth, seventh, and eight predetermined pixel patterns represented by the information held in the store section 2. The first pixel pattern is designed so as to emphasize a horizontal (transverse) thin black line. The fourth pixel pattern is designed so as to suppress a spread of the thin black line which might be caused by the emphasis using the first pixel pattern. The second pixel pattern is designed so as to emphasize a vertical (longitudinal) thin black line. The third pixel pattern is designed so as to suppress a spread of the thin black line which might be caused by the emphasis using the second pixel pattern. The fifth and seventh pixel patterns are designed so as to suppress a spread of an end of a horizontal thin black line. The sixth and eighth pixel patterns are designed so as to suppress a spread of an end of a vertical thin black line.

As shown in FIG. 13, the 2-bit output data depends on the number of black pixels in the 2×2-pixel input data. In addition, the 2-bit output data depends on black-white pixel patterns of the 4×4-pixel input data. Specifically, in the case where a black pixel is absent from the 2×2-pixel input data, the 2-bit output data corresponds to the white level. In the case where the 2×2-pixel input data has only one black pixel, the 2-bit output data corresponds to the white level when the 4×4-pixel input data has a part which agrees with at least one of the fifth, sixth, seventh, and eighth pixel patterns (see FIG. 16), and the 2-bit output data corresponds to the light gray level otherwise. In the case where the 2×2-pixel input data has two black pixels: the 2-bit output data corresponds to the dark gray level when the 4×4-pixel input data has a part which agrees with at least one of the first and second pixel patterns (see FIG. 14); the 2-bit output data corresponds to the white level when the 4×4-pixel input data has a part which agrees with at least one of the third and fourth pixel patterns (see FIG. 15); and the 2-bit output data corresponds to the light gray level otherwise. In the case where the 2×2-pixel input data has three black pixels, the 2-bit output data corresponds to the dark gray level. In the case where the 2×2-pixel input data has four black pixels, the 2-bit output data corresponds to the black level.

Figure 18A:
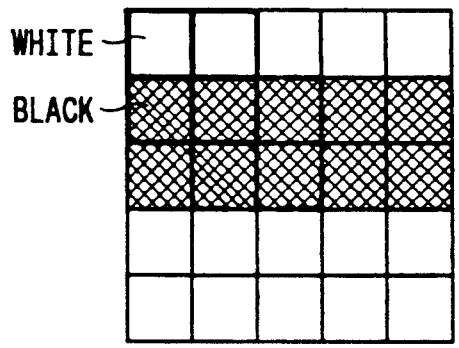
FIG. 18(a) and 18(b) are diagrams showing the conditions of a portion of an original image.
Figure 18B:
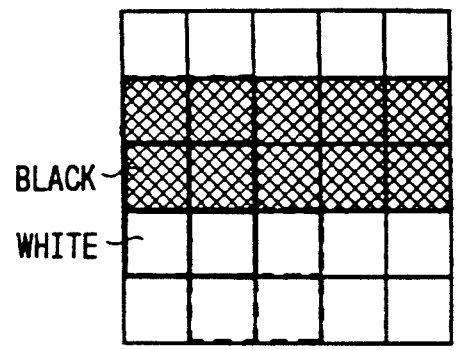
Figure 18C:
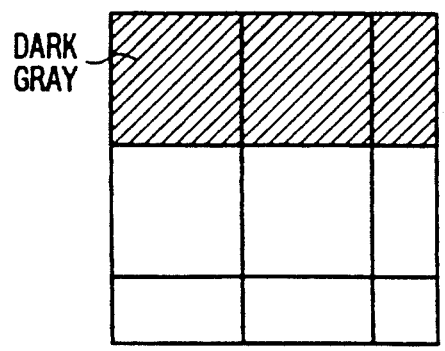
FIG. 18(c) is a diagram showing the conditions of a portion of a reduction-resultant image which is generated from the original image of FIGS. 18(a) and 18(b) by the image reducing apparatus of FIG. 1.

A description will now be given of processing an original image which includes a horizontal thin black line with a width corresponding to two pixels as shown in FIGS. 18(a) and 18(b). Each 2×2-pixel area of the original image which has two lower black pixels as shown in FIG. 18(a) is reduced to a dark gray pixel of a reduction-resultant image by referring to the first pixel pattern in FIG. 14. Each 2×2-pixel area of the original image which has two upper black pixels as shown in FIG. 18(b) is reduced to a white pixel of the reduction-resultant image by referring to the fourth pixel pattern in FIG. 15. Consequently, as shown in FIG. 18(c), the reduction-resultant image includes a horizontal dark gray thin line which corresponds to a reduction of the horizontal thin black line in the original image.

Figure 17A:
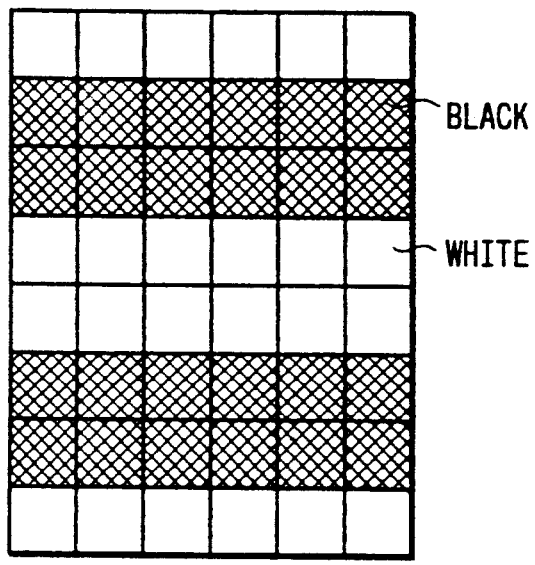
FIG. 17(a) is a diagram showing the conditions of a portion of an original image.
Figure 17B:
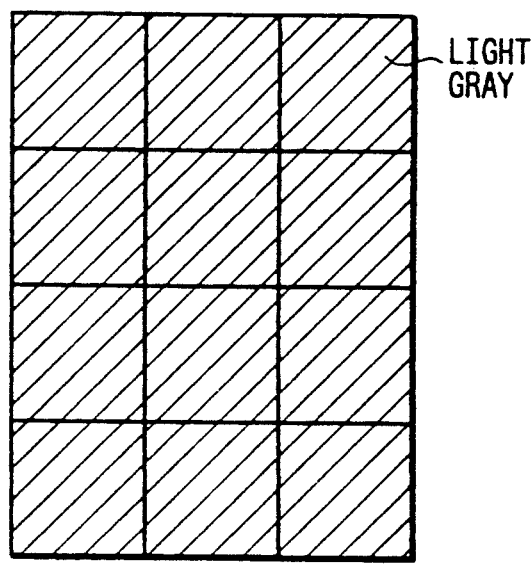
FIG. 17(b) is a diagram showing the conditions of a portion of a reduction-resultant image which is generated from the original image of FIG. 17(b) by an assumed design.

For a better understanding of the advantage of the embodiment of this invention, the following design is now assumed. In the assumed design, each 2×2-pixel area of an original image which has two lower black pixels and two upper white pixels is reduced to a light gray pixel of a reduction-resultant image independent of the conditions of a surrounding area. Furthermore, the assumed design, each 2×2-pixel area of an original image which has two lower white pixels and two upper black pixels is reduced to a light gray pixel of the reduction-resultant image independent of the conditions of a surrounding area. According to the assumed design, an original image which includes horizontal thin black lines as shown in FIG. 17(a) is reduced to a resultant image in FIG. 17(b). As shown in FIG. 17(b), corresponding thin lines are omitted from the reduction-resultant image. On the other hand, according to the embodiment of this invention, a reduction-resultant image has horizontal thin dark gray lines as understood from the previous description related to FIGS. 18(a)–18(c).

Figure 19A:
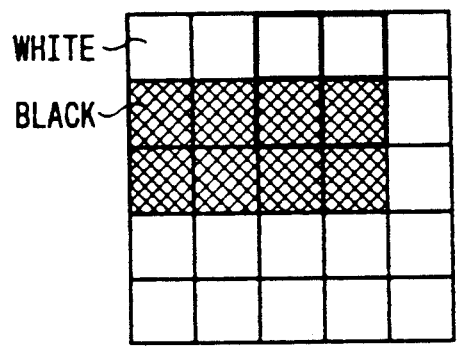
FIG. 19(a) and 19(b) are diagrams showing the conditions of a portion of an original image.
Figure 19B:
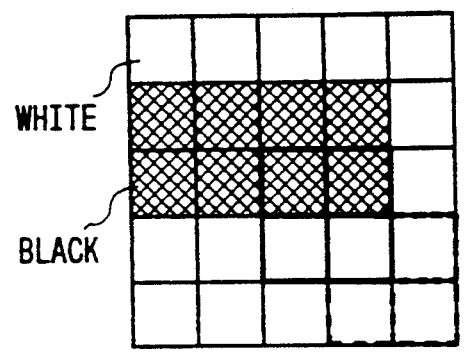
Figure 19C:
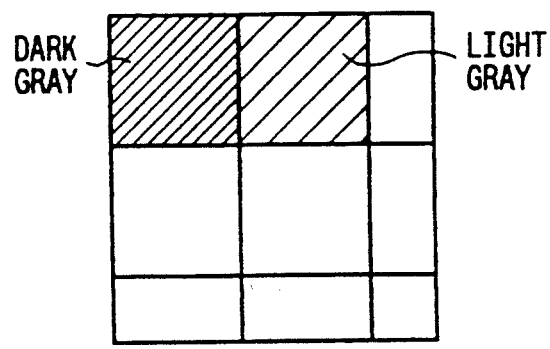
FIG. 19(c) is a diagram showing the conditions of a portion of a reduction-resultant image which is generated from the original image of FIGS. 19(a) and 19(b) by the image reducing apparatus of FIG. 1.

A description will now be given of processing an end of a horizontal thin black line in an original image which has a width corresponding to two pixels as shown in FIGS. 19(a) and 19(b). The 2×2-pixel area of the original image which has two lower black pixels and which includes the upper half of the end of the black line as shown in FIG. 19(a) is reduced to a light gray pixel of a reduction-resultant image since the 2×2-pixel area and a surrounding area do not have any of the first, second, third, and fourth pixel patterns in FIGS. 14 and 15. The 2×2-pixel area of the original image which has two upper black pixels and which includes the lower half of the end of the black line as shown in FIG. 19(b) is reduced to a white pixel of the reduction-resultant image by referring to the fourth pixel pattern in FIG. 15. Consequently, as shown in FIG. 19(c), the end of the black line in the original image is converted to a light gray pixel of the reduction-resultant image.

Figure 21A:
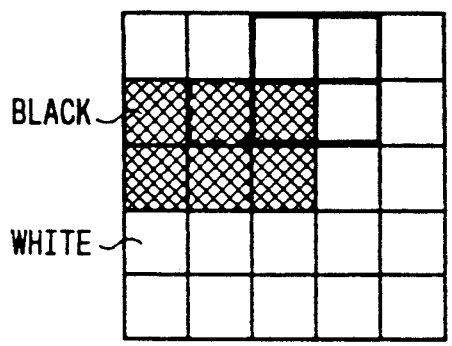
FIG. 21(a) and 21(b) are diagrams showing the conditions of a portion of an original image.
Figure 21B:
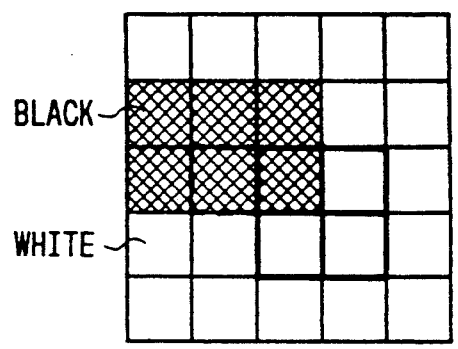
Figure 21C:
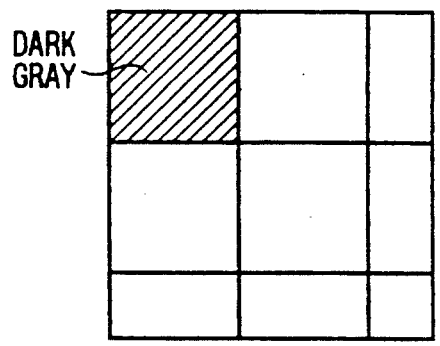
FIG. 21(c) is a diagram showing the conditions of a portion of a reduction-resultant image which is generated from the original image of FIGS. 21(a) and 21(b) by the image reducing apparatus of FIG. 1.

A description will now be given of processing an end of a horizontal thin black line in an original image which has a width corresponding to two pixels as shown in FIGS. 21(a) and 21(b). The 2×2-pixel area of the original image which has a lower left black pixel and which includes the upper half of the end of the black line as shown in FIG. 21(a) is reduced to a white pixel of a reduction-resultant image by referring to the seventh pixel pattern in FIG. 16. The 2×2-pixel area of the original image which has a left upper black pixel and which includes the lower half of the end of the black line as shown in FIG. 21(b) is reduced to a white pixel of the reduction-resultant image by referring to the fifth pixel pattern in FIG. 16. Consequently, as shown in FIG. 21(c), the end of the black line in the original image is converted to a white pixel of the reduction-resultant image.

Figure 20A:
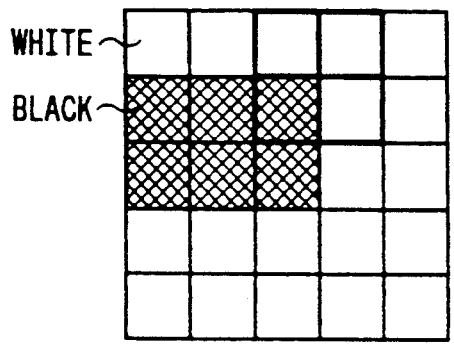
FIG. 20(a) and 20(b) are diagrams showing the conditions of a portion of an original image.
Figure 20B:
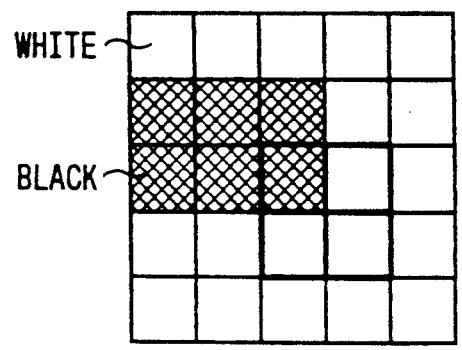
Figure 20C:
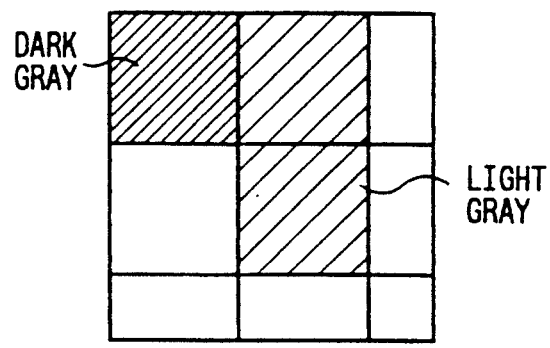
FIG. 20(c) is a diagram showing the conditions of a portion of a reduction-resultant image which is generated from the original image of FIGS. 20(a) and 20(b) by an assumed design.

For a better understanding of the advantage of the embodiment of this invention, the following design is now assumed. In the assumed design, the 2×2-pixel area of an original image which has a lower left black pixel and which includes the upper half of an end of a black line as shown in FIG. 20(a) is reduced to a light gray pixel of a reduction-resultant image. Furthermore, in the assumed design, the 2×2-pixel area of the original image which has a left upper black pixel and which includes the lower half of the end of the black line as shown in FIG. 20(b) is reduced to a light gray pixel of the reduction-resultant image. According to the assumed design, as shown in FIG. 20(c), a light gray downward projection appears in an end of a horizontal line of the reduction-resultant image which corresponds to the horizontal black line of the original image. On the other hand, according to the embodiment of this invention, such a downward projection does not appear as understood from the previous description related to FIGS. 21(a)-21(c).

Figure 22A:
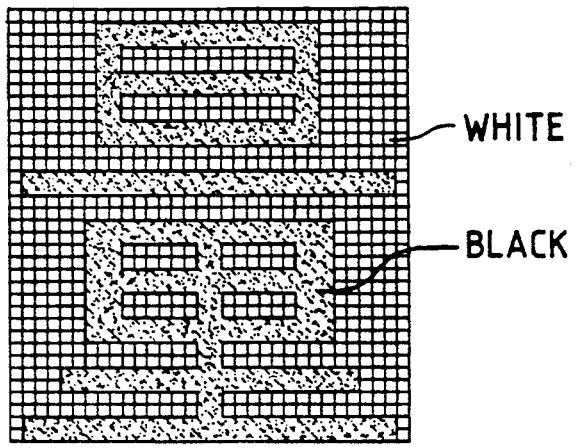
FIG. 22(a) is a diagram showing the conditions of an original image.
Figure 22B:
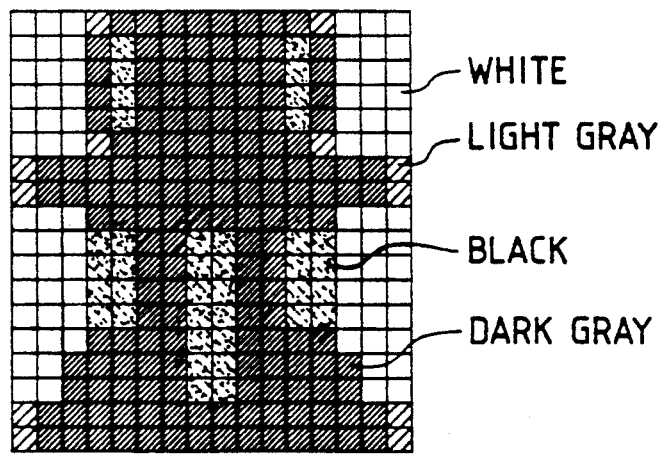
FIG. 22(b) is a diagram showing the conditions of a reduction-resultant image which is generated from the original image of FIG. 22(a) by a prior art design.
Figure 22C:
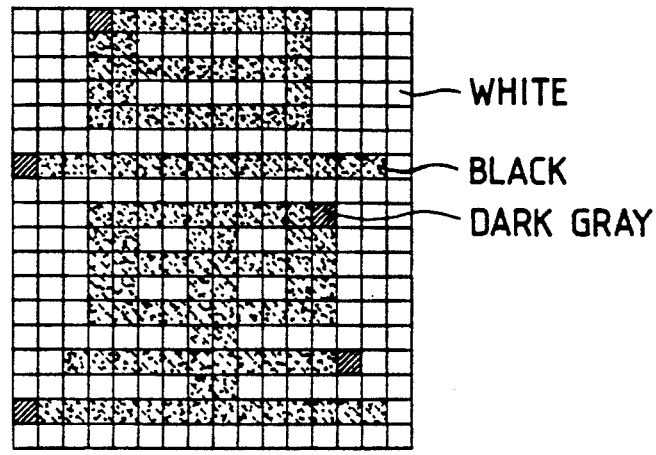
FIG. 22(c) is a diagram showing the conditions of a reduction-resultant image which is generated from the original image of FIG. 22(a) by the image reducing apparatus of FIG. 1.

According to the embodiment of this invention, an original image of FIG. 22(a) is reduced to a resultant image of FIG. 22(c). According to a prior art image reducing apparatus in which the tone level of a pixel in a reduction-resultant image is determined only by the number of black pixels in a predetermined-size area in an original image, the original image of FIG. 22(a) is reduced to a resultant image of FIG. 22(b). As understood from the comparison between FIGS. 22(b) and 22(c), the embodiment of this invention is advantageous over the prior art image reducing apparatus.

Figure 35:
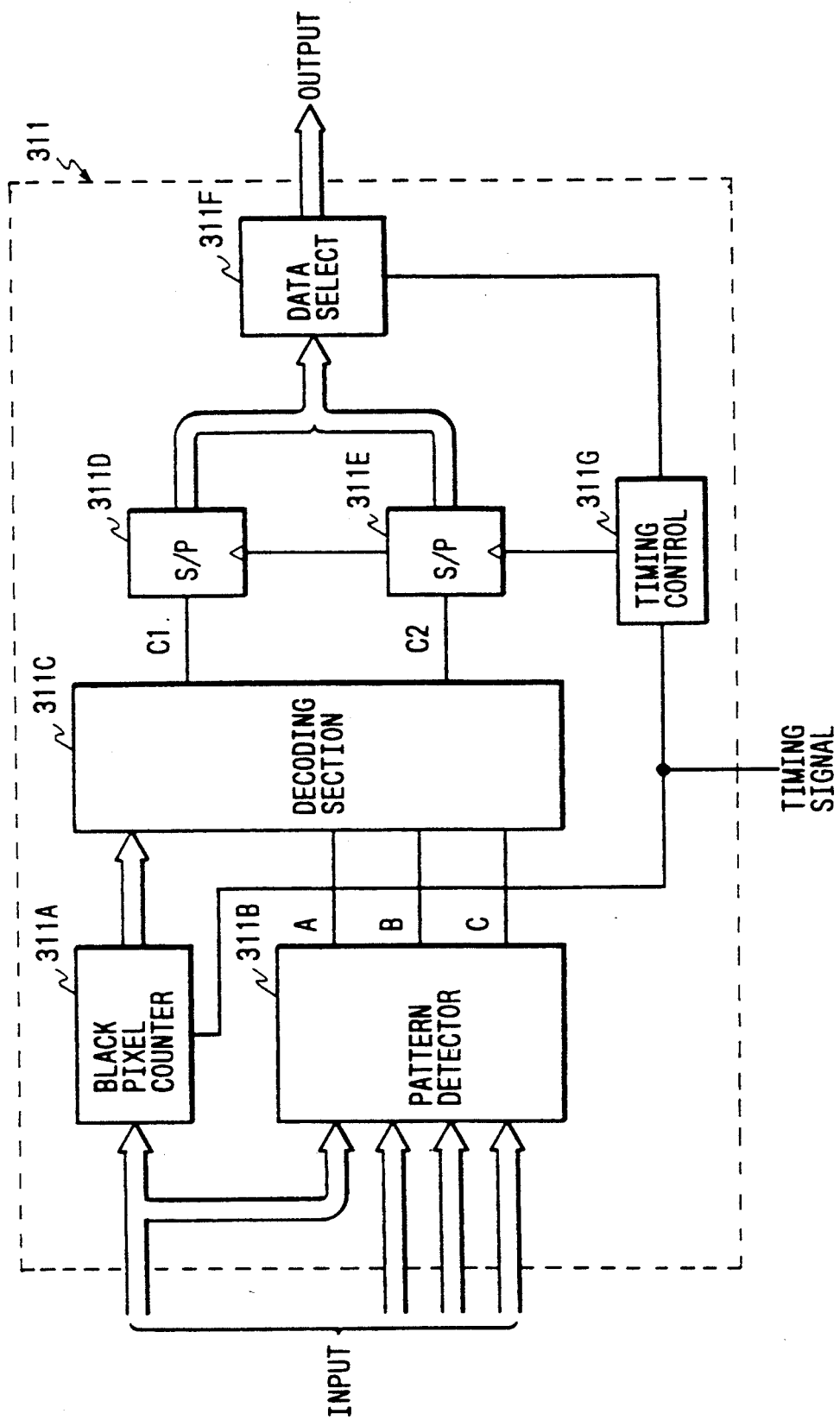
FIG. 35 is a block diagram of the decoder in FIG. 2.

FIG. 35 shows the details of the decoder 311. As shown in FIG. 35, the decoder 311 includes a black pixel counter 311A, a pattern detector 311B, a decoding section 311C, serial-to-parallel (S/P) converters 311D and 311E, a data selector 311F, and a timing controller 311G. The black pixel counter 311A receives the output signal from the data shifter 305 (see FIG. 2), and also receives the timing signal from the timing signal generator 304 (see FIG. 2). The black pixel counter 311A counts and detects the number of black pixels in the 2×2-pixel area of the original image. The black pixel counter 311A outputs a signal representing the detected number of black pixels in the 2×2-pixel area of the original image. The output signal from the black pixel counter 311A is fed to the decoding section 311C. The pattern detector 311B receives the output signals from the devices 305-308 (see FIG. 2). The pattern detector 311B detects the first, second, third, fourth, fifth, sixth, seventh, and eighth patterns (see FIGS. 14-16) in the 4×4-pixel area of the original image. The pattern detector 311B outputs 1-bit signals "A", "B", and "C". When the first or second pattern is detected, only the signal "A" assumes a high level. When the third or fourth pattern is detected, only the signal "B" assumes a high level. When the fifth, sixth, seventh, or eighth pattern is detected, only the signal "C" assumes a high level. The output signals "A", "B", and "C" from the pattern detector 311B are fed to the decoding section 311C. The decoding section 311C decodes the output signals from the black pixel counter 311A and the pattern detector 311B into the pixel data C1 and C2. The pixel data C1 and C2 are fed to the S/P converters 311D and 311E respectively. The timing controller 311G receives the timing signal from the timing signal generator 304 (see FIG. 2), and generates second and third timing signals in response to the received timing signal. The second timing signal is outputted from the timing controller 311G to the S/P converters 311D and 311E. The third timing signal is outputted from the timing controller 311G to the data selector 311F. The S/P converter 311D converts the pixel data C1 into corresponding parallel-form data. The output data from the S/P converter 311D is fed to the data selector 311F. The S/P converter 311E converts the pixel data C2 into corresponding parallel-form data. The output data from the S/P converter 311E is fed to the data selector 311F. The data selector 311F alternately selects one of the output data from the S/P converter 311D and the output data from the S/P converter 311E, and outputs the selected data to the data writing section 41 (see FIG. 10).

Figure 36:
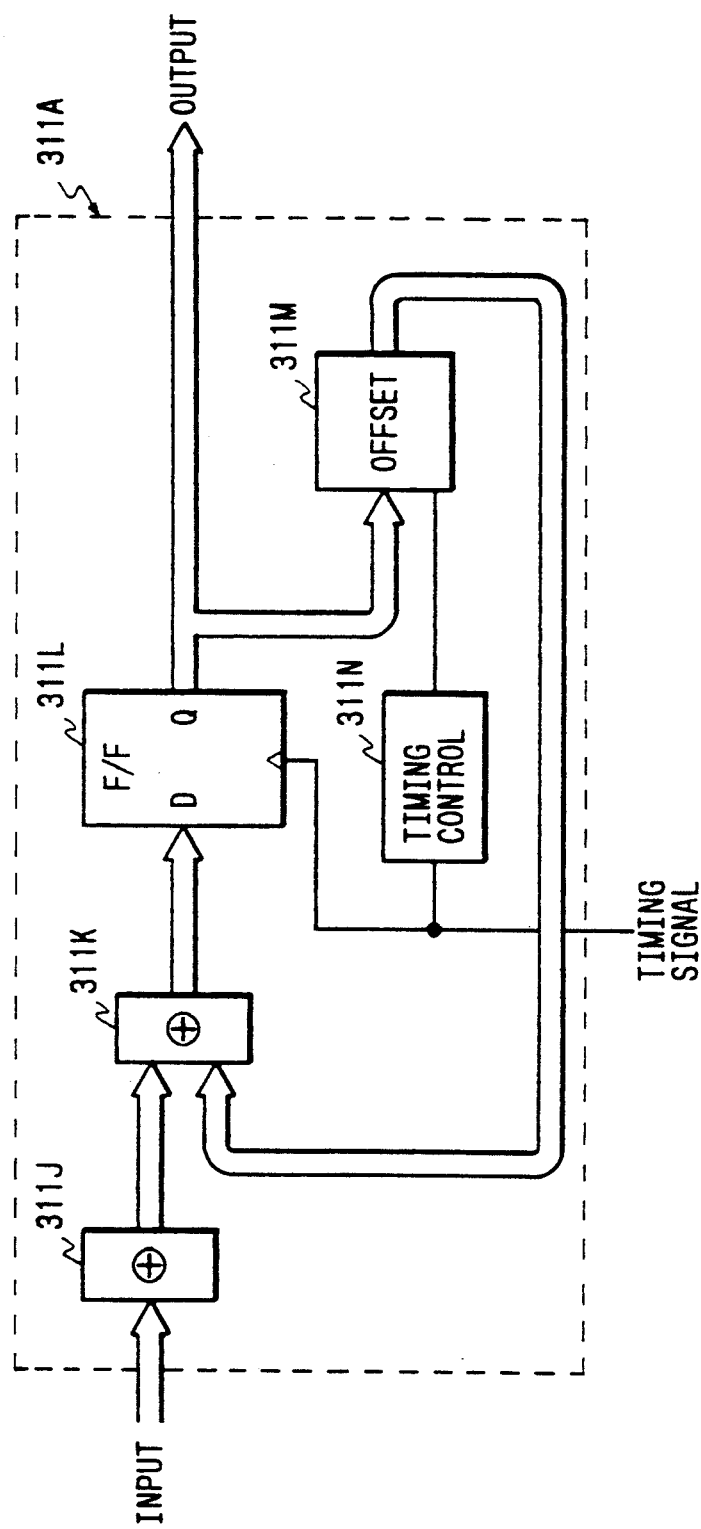
FIG. 36 is a block diagram of the black pixel counter in FIG. 35.

FIG. 36 shows the details of the black pixel counter 311A. As shown in FIG. 36, the black pixel counter 311A includes adders 311J and 311K, a flip-flop 311L, an offset generator 311M, and a timing controller 311N. The adder 311J acts on the part of the output signal from the data shifter 305 (see FIG. 2) which corresponds to the later two bits of the 2×2-pixel area of the original image. The adder 311J adds the later two bits of the 2×2-pixel area of the original image, and thereby detects the number of a black pixel or black pixels in the later two pixels of the 2×2-pixel area of the original image. The output signal from the adder 311J is fed to the adder 311K. The adder 311K, the flip-flop 311L, and the offset generator 311M are connected in a feedback loop. The adder 311K receives the output signal from the offset generator 311M which represents the number of a back pixel or black pixels in the former two pixels of the 2×2-pixel area of the original image. The adder 311K adds the output signals from the devices 311J and 311M, and thereby detects the number of a pack pixel or black pixels in the 2×2-pixel area of the original image. The output signal from the adder 311K is transmitted to the decoding section 311C (see FIG. 35) via the flip-flop 311L. The flip-flop 311L operates in response to the timing signal fed from the timing signal generator 304 (see FIG. 2). The timing controller 311N receives the timing signal from the timing signal generator 304 (see FIG. 2), and generates a second timing signal on the basis of the received timing signal. The second timing signal is fed from the timing controller 311N to the offset generator 311M. The offset generator 311M operates in response to the second timing signal.

Figures 37, 38:
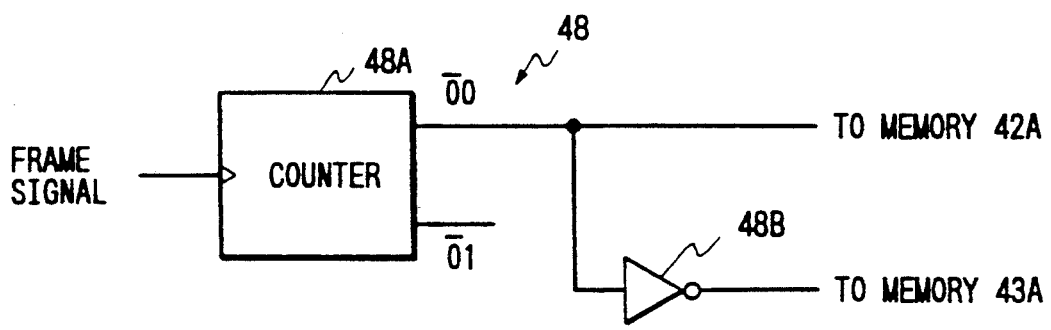
FIG. 37 is a diagram showing the contents of the table in the decoding section of FIG. 35.
FIG. 38 is a block diagram of the buffer change circuit in FIG. 10.

The decoding section 311C includes, for example, a ROM which holds a table determining the relation between input data and output data. As understood from the previous description, the input data represents the number of a black pixel or black pixels in the 2×2-pixel area of the original image, and also represents whether the first, second, third, fourth, fifth, sixth, seventh, or eighth pixel pattern (see FIGS. 14-16) is detected in the 4×4-pixel area of the original image. The output data agrees with the data C1 and C2. FIG. 37 shows the contents of the table. In FIG. 37, the character "x" denotes a "don't care" state. As shown in FIG. 37, in the case where a black pixel is absent from the 2×2-pixel input data, both the output data C1 and C2 assume a low level. In the case where the 2×2-pixel input data has only one black pixel, both the output data C1 and C2 assume the low level when the fifth, sixth, seventh, or eighth pixel pattern (see FIG. 16) is detected, and the output data C1 and C2 assume the low level and a high level respectively otherwise. In the case where the 2×2-pixel input data has two black pixels: the output data C1 and C2 assume the high level and the low level respectively when the first or second pixel pattern (see FIG. 14) is detected; both the output data C1 and C2 assume the low level when the third or fourth pixel pattern (see FIG. 15) is detected; and the output data C1 and C2 assume the low level and the high level respectively otherwise. In the case where the 2×2-pixel input data has three black pixels, the output data C1 and C2 assume the high level and the low level respectively. In the case where the 2×2-pixel input data has four black pixels, both the output data C1 and C2 assume the high level.

FIG. 38 shows the details of the buffer change circuit 48. As shown in FIG. 38, the buffer change circuit 48 includes a ternary counter 48A and an inverter 48B. The ternary counter 48A receives the frame signal from the display controller main part 44A (see FIG. 10). The ternary counter 48A counts pulses of the frame signal, and outputs a 2-bit signal which periodically changes as "0, 0", "0, 1", and "1, 0". The higher bit of the output 2-bit signal from the ternary counter 48A is fed to the first frame memory 42A (see FIG. 10) as a control signal by which the first frame memory 42A is selected and activated. The higher bit of the output 2-bit signal from the ternary counter 48A is fed to the inverter 48B. The output signal from the inverter 48B is fed to the second frame memory 43A (see FIG. 10) as a control signal by which the second frame memory 43A is selected and activated.

DESCRIPTION OF THE SECOND PREFERRED EMBODIMENT

Figure 23:
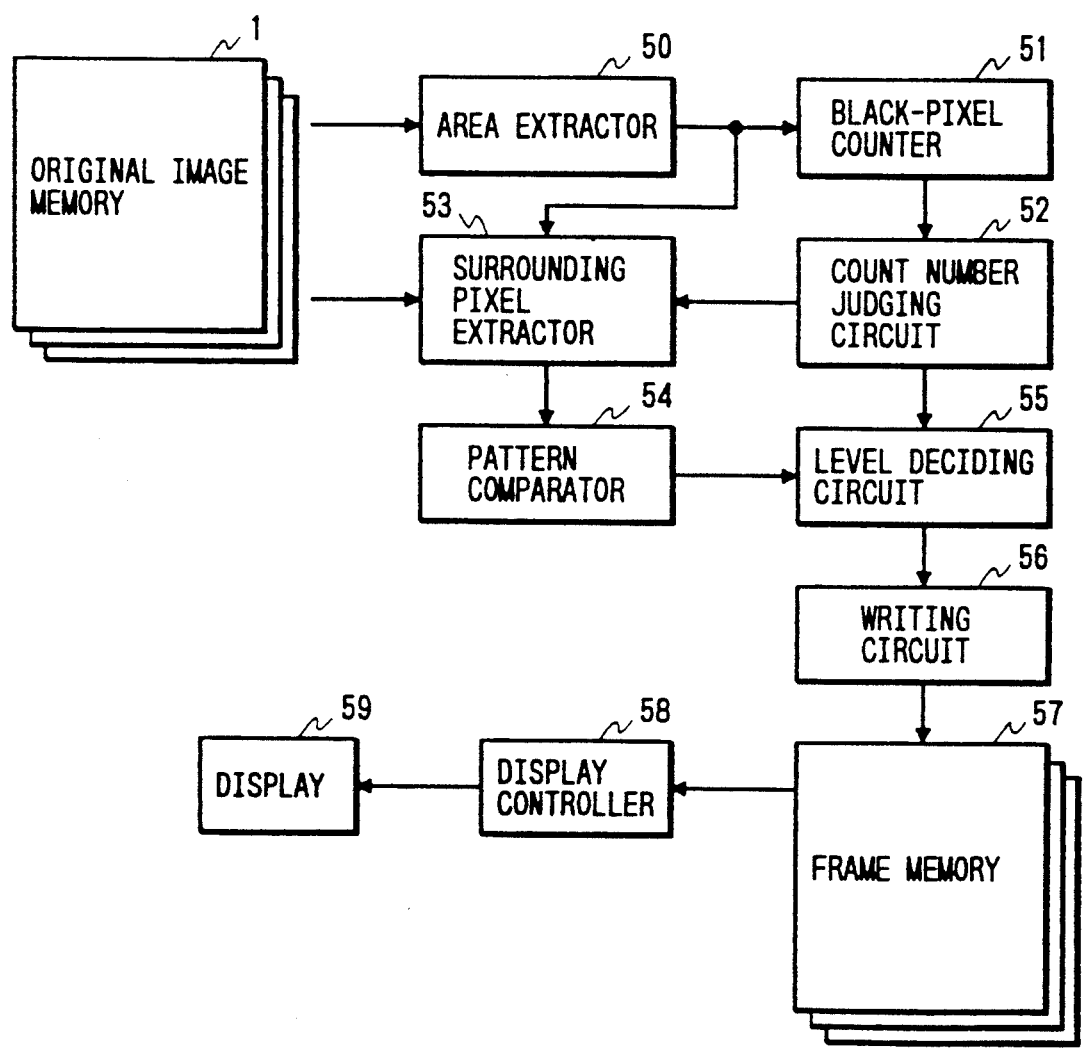
FIG. 23 is a block diagram of an image reducing apparatus according to a second embodiment of this invention.

With reference to FIG. 23, an image reducing apparatus includes a memory 1 and an area extractor 50. The memory 1 stores information or data representing a bi-level (black/white-level) original image. Since the original image is represented by black and white levels, each pixel of the original image is represented by a 1-bit data. The original image information is generally inputted via a suitable device such as an image scanner. The area extractor 50 reads out pixel information of an N×M-pixel area from the original image memory 1, where N and M denote predetermined integers equal to or greater than 2. The N×M-pixel area corresponds to reduction unit. In the embodiment of this invention, N and M are equal to 2.

A black-pixel counter 51 calculates the number of black pixels in the 2×2-pixel area which is read out by the area extractor 50. A count-number judgment circuit 52 transfers the count number from the black-pixel counter 51 to a pixel-tone decision circuit 55. In addition, the count-number judgment circuit 52 judges whether or not the count number is equal to 1. When the count number is equal to 1, the count-number judgment circuit 52 activates a surrounding-pixel extractor 53.

The embodiment of this invention can recognize patterns of thin inclined lines. This recognition uses information represented by the 2×2-pixel area and an area surrounding the former area. Specifically, information represented by four pixels surrounding the 2×2-pixel area is extracted from the original image data in the memory 1 by the surrounding-pixel extractor 53. In addition, the four surrounding pixels are determined or selected in accordance with the position of a black pixel within the 2×2-pixel area. The pattern of data of the four surrounding pixels is compared with reference patterns of inclined lines by a pattern comparator 54.

A description will now be given of the four surrounding pixels which are extracted by the surrounding-pixel extractor 53 with reference to FIGS. 24 and 25. In FIG. 24, the letters A, B, C, and D denote the pixels of the 2×2-pixel area, and the characters #1–#8 denote the pixels surrounding the 2×2-pixel area. As shown in FIG. 25, four of the surrounding pixels #1–#8 are selected as extracted pixels N1–N4 in accordance with which of the pixels A, B, C, and D corresponds to a black level, that is, in accordance with the position of the black pixel within the 2×2-pixel area. Information represented by the four selected surrounding pixels N1–N4 is extracted by the surrounding-pixel extractor 53, being fed to the pattern comparator 54.

FIG. 26 shows the relation between 4-bit input data into the pattern comparator 54 and 1-bit output data from the pattern comparator 54. When the input pattern disagrees with any of the reference patterns, the output data is set to "0" which corresponds to a white level. When the input pattern agrees with one of the reference patterns, the output data is set to "1" which corresponds to a non-white level.

The pixel-tone decision circuit 55 decides the tone level of a pixel of a reduction-resultant image in accordance with the output count number from the black-pixel counter 51 and the output data from the pattern comparator 54. In the embodiment of this invention, the tone of a pixel of the reduction-resultant image is changeable among three different levels, that is, a white level, a gray level (a non-white level), and a black level. The pixel-tone decision circuit 55 sets the tone level of the reduced-image pixel to the white level when the black-pixel count number is equal to 0. The pixel-tone decision circuit 55 sets the tone level of the reduced-image pixel to the black level when the black-pixel count number is equal to 3 or 4. The pixel-tone decision circuit 55 sets the tone of the reduced-image pixel to the gray level when the black-pixel count number is equal to 2. In the case where the black-pixel count number is equal to 1, the pixel-tone decision circuit 55 sets the tone of the reduced-image pixel to the white level when the output data from the pattern comparator 54 is "0", and the pixel-tone decision circuit 55 sets the tone of the reduced-image pixel to the gray level when the output data from the pattern comparator 54 is "1".

A data writing circuit 56 writes the information of the decided tone level of the reduced-image pixel from the pixel-tone decision circuit 55 into an address of a reduced-image frame memory 57 which corresponds to the reduced-image pixel. A display controller 58 reads out the reduced-image pixel information from the frame memory 57, and transmits the readout information to a display 59. The readout information is indicated by the display 59 as a reproduced image which agrees with a reduction of the original image.

The overall operation of the image reducing apparatus will now be explained. Original image information is stored into the memory 1 in a suitable way. Pieces of the original image information which are represented by 2×2-pixel areas are sequentially extracted by the area extractor 50. Black pixels in each 2×2-pixel area are counted by the black-pixel counter 51, and the resultant black-pixel count number is transmitted to the pixel-tone decision circuit 55 via the count-number judgment circuit 52. When the black-pixel count number is equal to 1, the count-number judgment circuit 52 activates the surrounding-pixel extractor 53 so that information represented by selected four surrounding pixels of FIG. 25 is read out from the original image memory 1 and is then fed to the pattern comparator 54. The pattern comparator 54 compares the input pattern with the reference patterns, executing pattern judgment of FIG. 26.

As described previously, the pixel-tone decision circuit 55 sets the tone level of a pixel of a reduction-resultant image to one of the white level, the gray level, and the black level in accordance with the pattern judgment result and the black-pixel count number. The pixel tone level information outputted from the pixel-tone decision circuit 55 is written into the reduced-image frame memory 57 by the data writing circuit 56. The reduced-image pixel information is read out from the frame memory 57 by the display controller 58, being transmitted to the display 59 and being indicated by the display 59 as a reproduced image which agrees with a reduction of the original image.

Figure 29A:
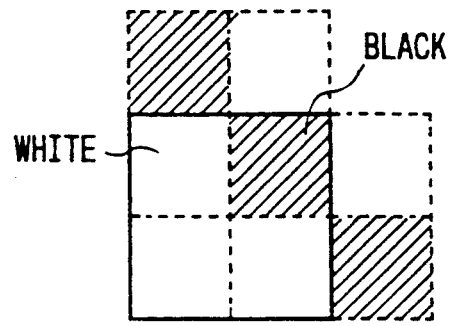
FIGS. 29(a)–29(c) are diagrams showing the conditions of pixels in the predetermined-size area and surrounding area.
Figure 29B:
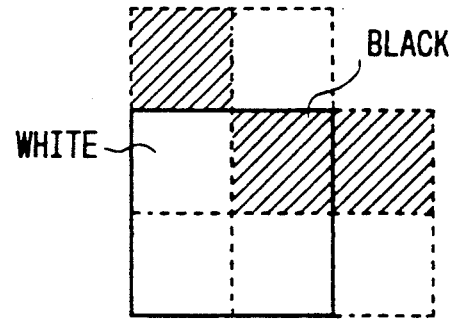
Figure 29C:
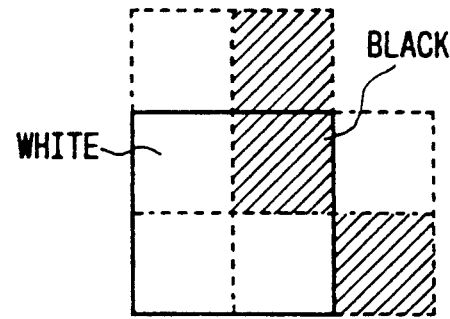

According to the embodiment of this invention, 2×2-pixel areas in FIGS. 29(a)-29(c) which correspond to parts of a thin inclined black line of an original image are reduced to a gray pixel of a reduction-resultant image. Thus, a cut is prevented from occurring in an inclined line of the reduction-resultant image which corresponds to the inclined line of the original image. On the other hand, according to a prior art decision-by-majority method, the 2×2-pixel areas in FIGS. 29(a)-29(c) are reduced to a white pixel of a reduction-resultant image so that cuts occur in an inclined line of the reduction-resultant image which corresponds to the inclined line of the original image.

Figure 30:
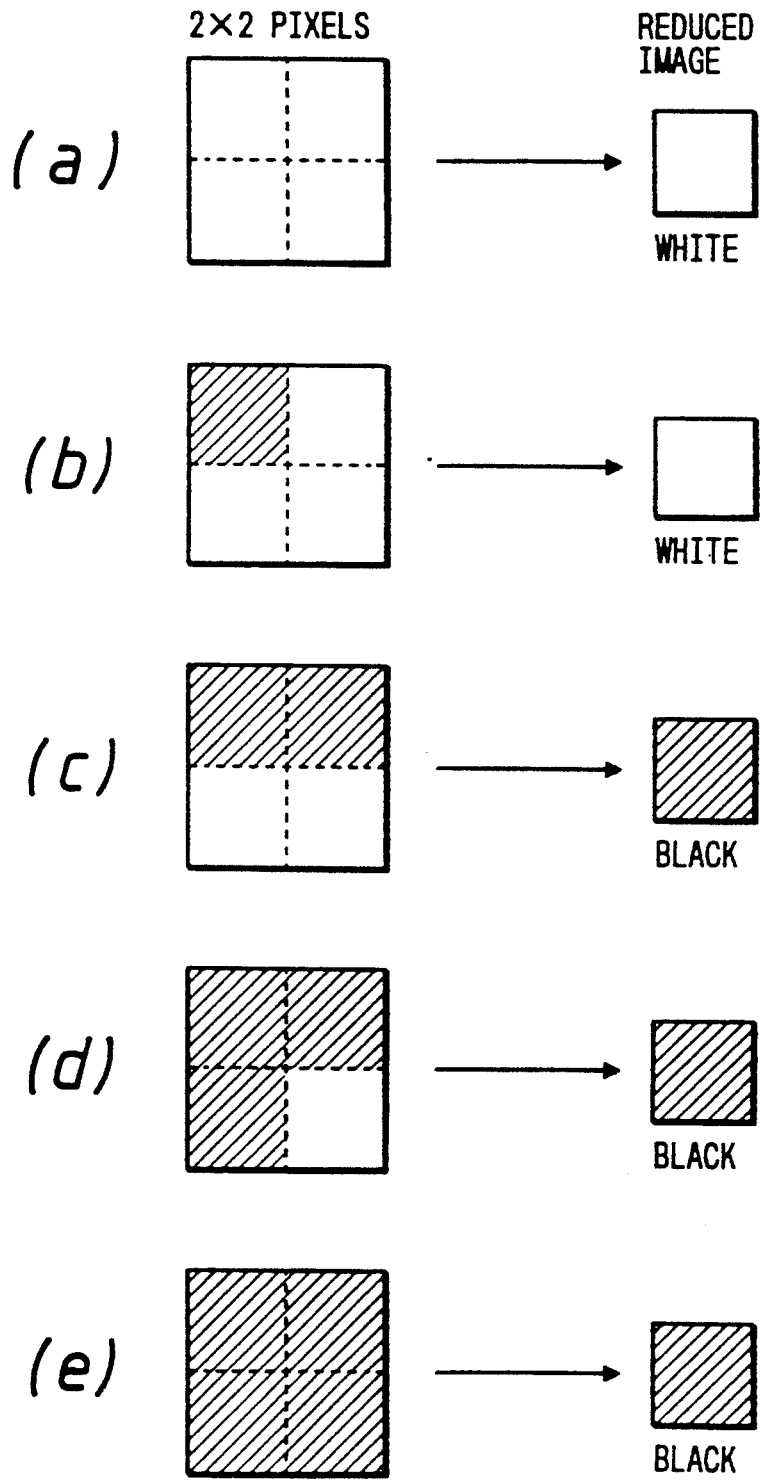
FIG. 30 is a diagram showing the relation between the conditions of a predetermined-size area in an original image and the conditions of a corresponding pixel in a reduction-resultant image in a prior art design.

According to the embodiment of this invention, an original-image 2×2-pixel area in the part (c) of FIG. 30 is reduced to a gray pixel of a reduction-resultant image. Thus, even when the number of non-white pixels in an original image increases, it is possible to obtain a reduction-resultant image having good visual characteristics. On the other hand, according to a prior art decision-by-majority method, the original-image 2×2-pixel area in the part (c) of FIG. 30 is reduced to a black pixel of a reduction-resultant image so that a reduction-resultant image tends to be excessively blacked when the number of non-white pixels in an original image increases.

Figure 27A:
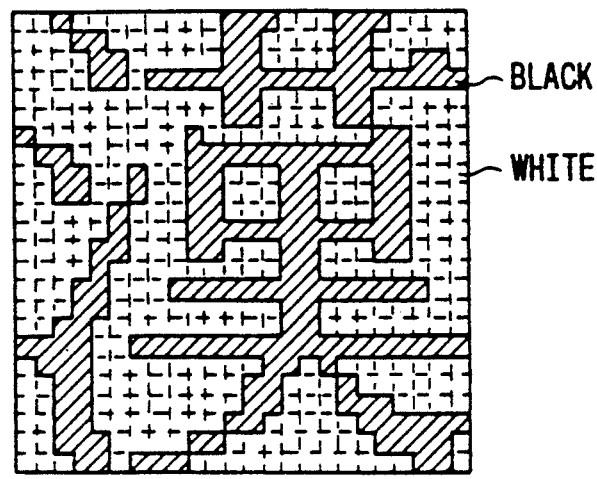
FIG. 27(a) is a diagram showing the conditions of an original image.
Figure 27B:
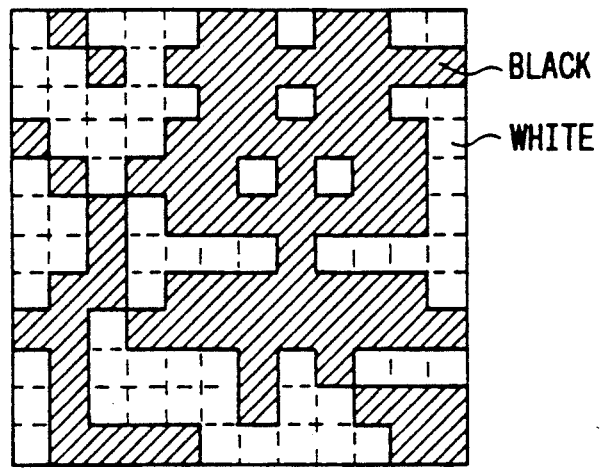
FIG. 27(b) is a diagram showing the conditions of a reduction-resultant image which is generated from the original image of FIG. 27(a) by a prior art design.
Figure 27C:
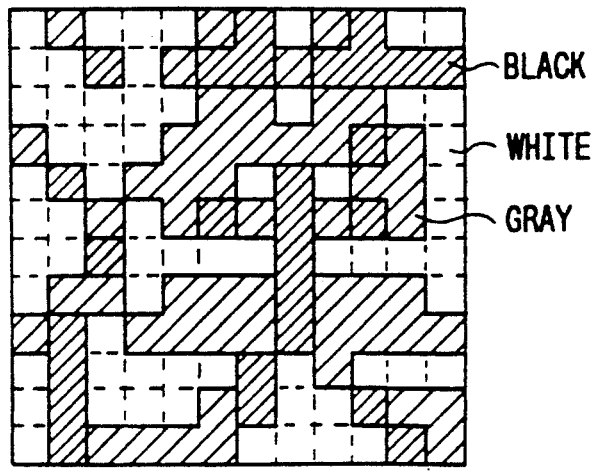
FIG. 27(c) is a diagram showing the conditions of a reduction-resultant image which is generated from the original image of FIG. 27(a) by the image reducing apparatus of FIG. 23.
Figure 28A:
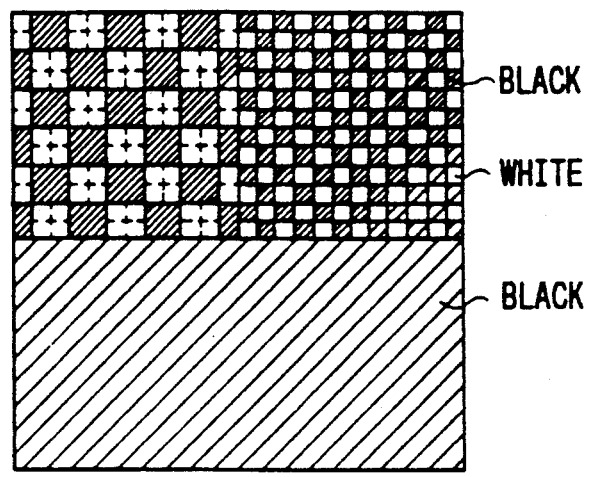
FIG. 28(a) is a diagram showing the conditions of an original image.
Figure 28B:
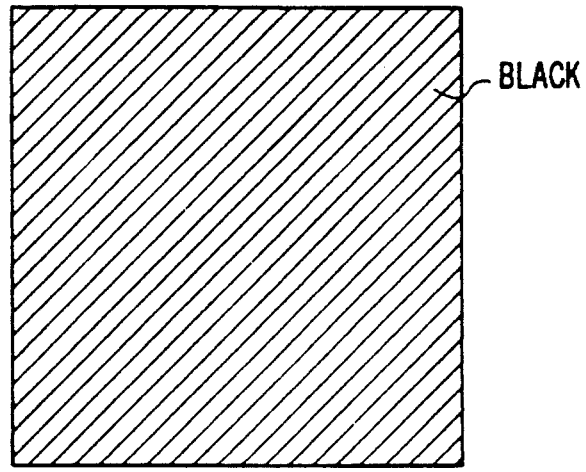
FIG. 28(b) is a diagram showing the conditions of a reduction-resultant image which is generated from the original image of FIG. 28(a) by a prior art design.
Figure 28C:
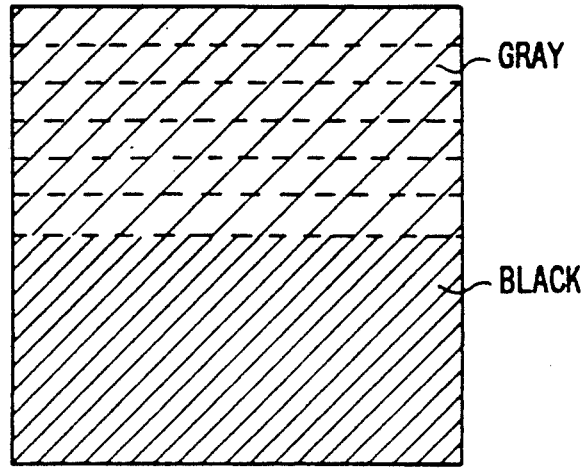
FIG. 28(c) is a diagram showing the conditions of a reduction-resultant image which is generated from the original image of FIG. 28(a) by the image reducing apparatus of FIG. 23.

According to the embodiment of this invention, an original image of FIG. 27(a) is converted into a reduced image of FIG. 27(c). According to a prior art decision-by-majority method, the original image of FIG. 27(a) is converted into a reduced image of FIG. 27(b). According to the embodiment of this invention, an original image of FIG. 28(a) is converted into a reduced image of FIG. 28(c). According to the prior art decision-by-majority method, the original image of FIG. 28(a) is converted into a reduced image of FIG. 28(b). It is clear from the comparison between FIGS. 27(b) and 27(c) and the comparison between FIGS. 28(b) and 28(c) that the embodiment of this invention is advantageous over the prior art decision-by-majority method.

It should be noted that the combination of the data writing circuit 56, the reduced-image frame memory 57, the display controller 58, and the display 59 may be replaced by the processing block 4 of FIG. 1.

DESCRIPTION OF THE THIRD PREFERRED EMBODIMENT

Figure 31:
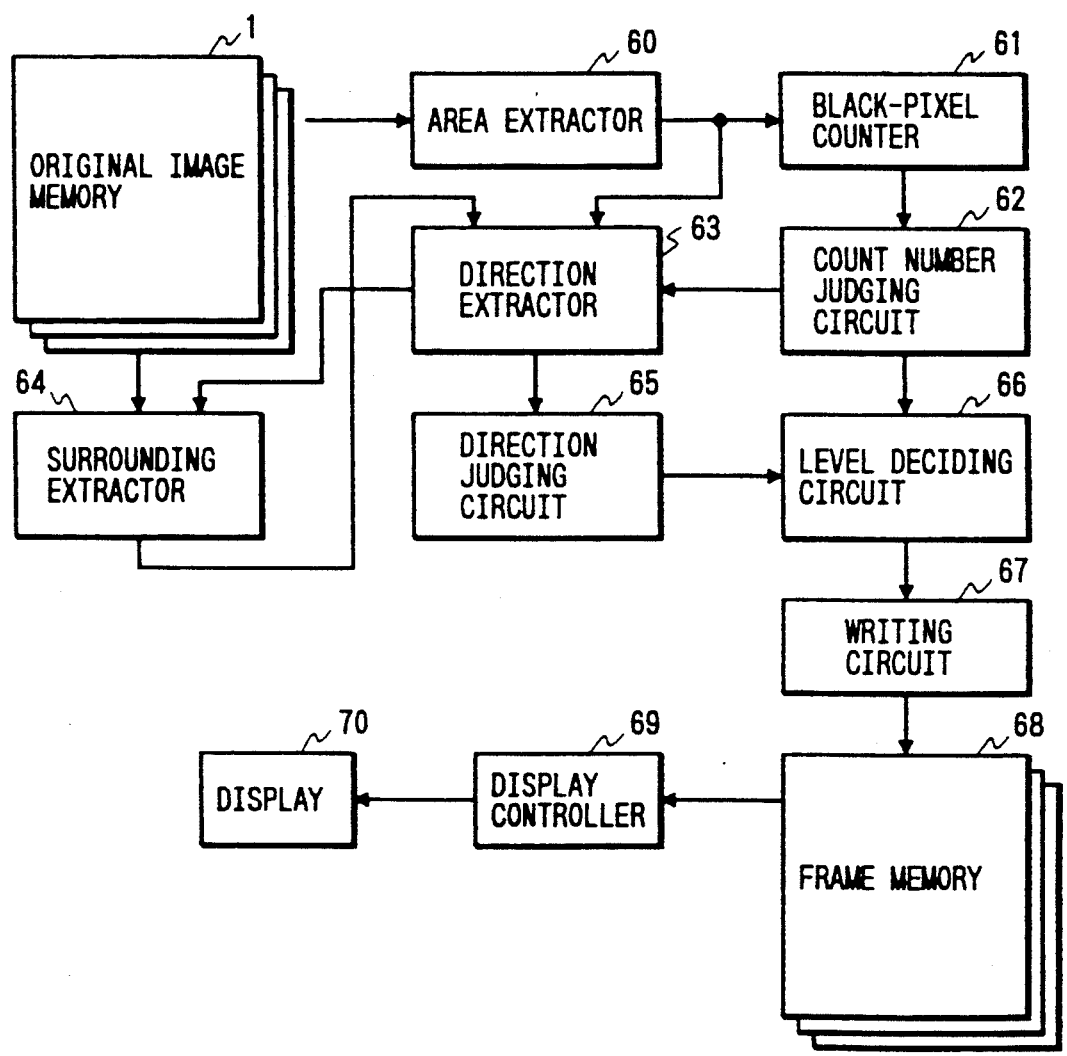
FIG. 31 is a block diagram of an image reducing apparatus according to a third embodiment of this invention.

With reference to FIG. 31, an image reducing apparatus includes a memory 1 and an area extractor 60. The memory 1 stores information or data representing a bi-level (black/white-level) original image. Since the original image is represented by black and white levels, each pixel of the original image is represented by a 1-bit data. The original image information is generally inputted via a suitable device such as an image scanner. The area extractor 60 reads out pixel information of an N×M-pixel area from the original image memory 1, where N and M denote predetermined integers equal to or greater than 2. The N×M-pixel area corresponds to a reduction unit. In the embodiment of this invention, N and M are equal to 3.

A black-pixel counter 61 calculates the number of black pixels in the 3×3-pixel area which is read out by the area extractor 60. A count-number judgment circuit 62 transfers the count number from the black-pixel counter 61 to a pixel-tone decision circuit 66. In addition, the count-number judgment circuit 62 judges whether or not the count number is equal to one of 2 and 3. When the count number is equal to 2 or 3, the count-number judgment circuit 62 activates a connection-direction extractor 63. A judgment is made as to whether or not a connection of black pixels in one of eight different directions is present in the 3×3-pixel area. The eight different directions correspond to "upper", "lower", "left", "right", "right upper", "right lower", "left upper", and "left lower" respectively. The connections of black pixels in the eight directions are extracted from the 3×3-pixel area by the connection-direction extractor 63.

The operation of the connection-direction extractor 63 will now be explained further with reference to FIG. 32. In FIG. 32, the characters D1-D9 denote the pixels in 3×3-pixel area. Each of the pixels D1-D9 has a value of "1" and "0" when it corresponds to a black pixel and a white pixel respectively. The eight connection-directions corresponding to "upper", "lower", "left", "right", "right upper", "right lower", "left upper", and "left lower" are represented by the characters Dir1, Dir2, Dir3, Dir4, Dir5, Dir6, Dir7, and Dir8 respectively. The connection directions Dir1-Dir8 are obtained from the pixels D1-D9 through AND operations and OR operations as follows.

$$Dir1 = (D1 \cdot D4) + (D2 \cdot D5) + (D3 \cdot D6)$$
$$Dir2 = (D4 \cdot D7) + (D5 \cdot D8) + (D6 \cdot D9)$$
$$Dir3 = (D1 \cdot D2) + (D4 \cdot D5) + (D7 \cdot D8)$$
$$Dir4 = (D2 \cdot D3) + (D5 \cdot D6) + (D8 \cdot D9)$$
$$Dir5 = (D2 \cdot D4) + (D3 \cdot D5) + (D6 \cdot D8)$$
$$Dir6 = (D2 \cdot D6) + (D5 \cdot D9) + (D4 \cdot D8)$$
$$Dir7 = (D1 \cdot D5) + (D2 \cdot D6) + (D4 \cdot D8)$$
$$Dir8 = (D2 \cdot D4) + (D5 \cdot D7) + (D6 \cdot D8)$$

Each of the connection directions Dir1-Dir8 is judged to be present and absent when it agrees with "1" and "0" respectively.

Information representing a connection direction being equal to "1" is outputted from the connection-direction extractor 63 to a surrounding-pixel extractor 64. Information represented by pixels surrounding the 3×3-pixel area is extracted from the original image data in the memory 1 by the surrounding-pixel extractor 64, the surrounding pixels being in a direction corresponding to the connection direction being equal to "1". The surrounding pixels are transmitted from the surrounding-pixel extractor 64 to the connection-direction extractor 63 as a surrounding-pixel connection direction. The connection direction being equal to "1" and the corresponding surrounding-pixel connection direction are paired in the connection-direction extractor 63, and the pair of the connection directions is outputted from the connection-direction extractor 63 to a connection judgment circuit 65. When the corresponding surrounding-pixel connection direction of FIG. 33 is equal to "1", the connection judgment circuit 65 judges the two areas to be in connection with each other and outputs "1" to the pixel-tone decision circuit 66. When the corresponding surrounding-pixel connection direction of FIG. 33 is equal to "0", the connection judgment circuit 65 judges the two areas to be out of connection with each other and outputs "0" to the pixel-tone decision circuit 66.

The pixel-tone decision circuit 66 decides the tone level of a pixel of a reduction-resultant image in accordance with the output count number from the black-pixel counter 61 and the output data from the connection judgment circuit 65. In the embodiment of this invention, the tone of a pixel of the reduction-resultant image is changeable among three different levels, that is, a white level, a gray level (a non-white level), and a black level. The pixel-tone decision circuit 66 sets the tone level of the reduced-image pixel to the white level when the black-pixel count number is equal to 0 or 1. The pixel-tone decision circuit 66 sets the tone level of the reduced-image pixel to the gray level when the black-pixel count number is equal to 4 or 5. The pixel-tone decision circuit 66 sets the tone of the reduced-image pixel to the black level when the black-pixel count number is equal to 6 or greater. In the case where the black-pixel count number is equal to 2 or 3, the pixel-tone decision circuit 66 sets the tone of the reduced-image pixel to the white level when the output data from the connection judgment circuit 65 is "0", and the pixel-tone decision circuit 66 sets the tone of the reduced-image pixel to the gray level when the output data from the connection judgment circuit 65 is "1".

A data writing circuit 67 writes the information of the decided tone level of the reduced-image pixel from the pixel-tone decision circuit 66 into an address of a reduced-image frame memory 68 which corresponds to the reduced-image pixel. A display controller 69 reads out the reduced-image pixel information from the frame memory 68, and transmits the readout information to a display 70. The readout information is indicated by the display 70 as a reproduced image which agrees with a reduction of the original image. It should be noted that the display 70 may be replaced by a printer.

The overall operation of the image reducing apparatus will now be explained. Original image information is stored into the memory 1 in a suitable way. Pieces of the original image information which are represented by 3×3-pixel areas are sequentially extracted by the area extractor 60. Black pixels in each 3×3-pixel area are counted by the black-pixel counter 61, and the resultant black-pixel count number is transmitted to the pixel-tone decision circuit 66 via the count-number judgment circuit 62. When the black-pixel count number is equal to 2 or 3, the count-number judgement circuit 62 activates the connection-direction extractor 63. A judgement is made as to whether or not a connection of black pixels in one of eight different directions is present in the 3×3-pixel area. The eight different directions correspond to "upper", "lower", "left", "right", "right upper", "right lower", "left upper", and "left lower" respectively. The connections of black pixels in the eight directions are extracted from the 3×3-pixel area by the connection-direction extractor 63. Each of the eight connection directions is judged to be present and absent when it agrees with "1" and "0" respectively. Information representing a connection direction being equal to "1" is outputted from the connection-direction extractor 63 to the surrounding-pixel extractor 64. Information represented by pixels surrounding the 3×3-pixel area is extracted from the original image data in the memory 1 by the surrounding-pixel extractor 64, the surrounding pixels being in a direction corresponding to the connection direction being equal to "1". The surrounding pixels are transmitted from the surrounding-pixel extractor 64 to the connection-direction extractor 63 as a surrounding-pixel connection direction. The connection direction being equal to "1" and the corresponding surrounding-pixel connection direction are paired in the connection-direction extractor 63, and the pair of the connection directions is outputted from the connection-direction extractor 63 to the connection judgment circuit 65. When the corresponding surrounding-pixel connection direction of FIG. 33 is equal to "1", the connection judgment circuit 65 judges the two areas to be in connection with each other and outputs "1" to the pixel-tone decision circuit 66. When the corresponding surrounding-pixel connection direction of FIG. 33 is equal to "0", the connection judgment circuit 65 judges the two areas to be out of connection with each other and outputs "0" to the pixel-tone decision circuit 66. The pixel-tone decision circuit 66 decides the tone level of a pixel of a reduction-resultant image in accordance with the output count number from the black-pixel counter 61 and the output data from the connection judgment circuit 65. In the embodiment of this invention, the tone of a pixel of the reduction-resultant image is changeable among three different levels, that is, a white level, a gray level (a non-white level), and a black level. The pixel-tone decision circuit 66 sets the tone level of the reduced-image pixel to the white level when the black-pixel count number is equal to 0 or 1. The pixel-tone decision circuit 66 sets the tone level of the reduced-image pixel to the gray level when the black-pixel count number is equal to 4 or 5. The pixel-tone decision circuit 66 sets the tone of the reduced-image pixel to the black level when the black-pixel count number is equal to 6 or greater. In the case where the black-pixel count number is equal to 2 or 3, the pixel-tone decision circuit 66 sets the tone of the reduced-image pixel to the white level when the output data from the connection judgment circuit 65 is "0", and the pixel-tone decision circuit 66 sets the tone of the reduced-image pixel to the gray level when the output data from the connection judgment circuit 65 is "1". The data writing circuit 67 writes the information of the decided tone level of the reduced-image pixel from the pixel-tone decision circuit 66 into an address of the reduced-image frame memory 68 which corresponds to the reduced-image pixel. The display controller 69 reads out the reduced-image pixel information from the frame memory 68, and transmits the readout information to the display 70. The readout information is indicated by the display 70 as a reproduced image which agrees with a reduction of the original image.

Figure 34A:
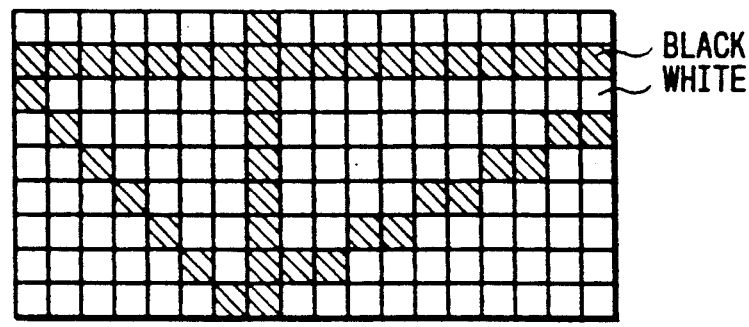
FIG. 34(a) is a diagram showing the conditions of an original image.
Figure 34B:
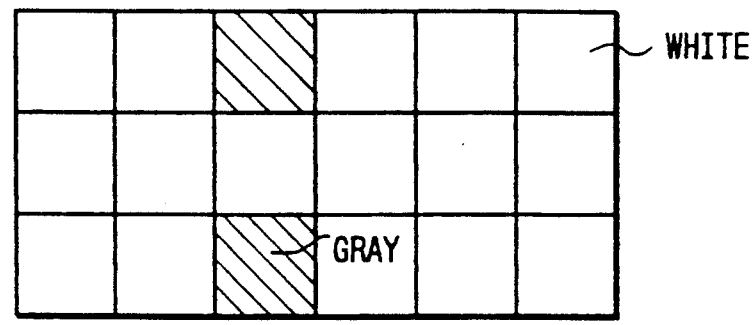
FIG. 34(b) is a diagram showing the conditions of a reduction-resultant image which is generated from the original image of FIG. 34(a) by a prior art design.
Figure 34C:
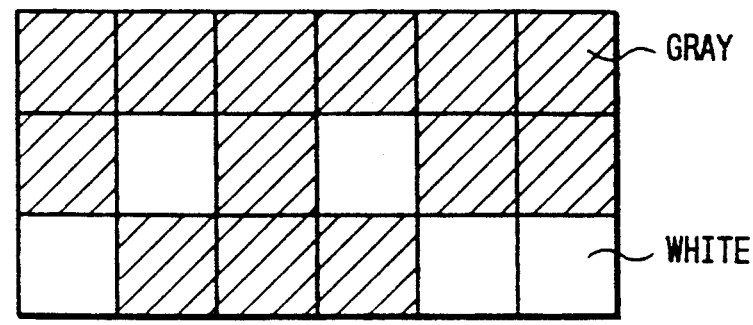
FIG. 34(c) is a diagram showing the conditions of a reduction-resultant image which is generated from the original image of FIG. 34(a) by the image reducing apparatus of FIG. 31.

According to the embodiment of this invention, an original image of FIG. 34(a) is converted into a reduced image of FIG. 34(c). According to a prior art decision-by-majority method, the original image of FIG. 34(a) is converted into a reduced image of FIG. 34(b). It is clear from the comparison between FIGS. 34(b) and 34(c) that the embodiment of this invention is advantageous over the prior art decision-by-majority method.

It should be noted that the combination of the data writing circuit 67, the reduced-image frame memory 68, the display controller 69, and the display 70 may be replaced by the processing block 4 of FIG. 1.

What is claimed is:

1. An image reducing apparatus comprising:
   black-pixel counting means for counting a number of black pixels in an N×M-pixel area in an original image represented by white and black levels, where N and M denote predetermined integers equal to or greater than 2;
   pattern comparing means for comparing a pixel pattern in the N×M-pixel area and an area surrounding the N×M-pixel area with predetermined reference patterns; and
   level determining means for determining a level of a pixel in a reduction-resultant image in accordance with the black-pixel number counted by the black-pixel counting means and with a result of the pattern comparison by the pattern comparing means, the reduction-resultant image pixel corresponding to the N×M-pixel area in the original image.

2. The image reducing apparatus of claim 1 wherein the level determining means comprises means for selectively making the determining the level of the pixel in the reduction-resultant image independent of and dependent on the result of the pattern comparison by the pattern comparing means in accordance with the black-pixel number counted by the black-pixel counting means.

3. The image reducing apparatus of claim 2 wherein N and M are equal to 2, and wherein the selectively making means comprises means for determining the level of the pixel in the reduction-resultant image in accordance with only the black-pixel number counted by the black-pixel counting means when the black-pixel number counted by the black-pixel counting means is equal to one of 0, 3, and 4, and means for determining the level of the pixel in the reduction-resultant image in accordance with the black-pixel number counted by the black-pixel counting means and with the result of the pattern comparison by the pattern comparing means when the black-pixel number counted by the black-pixel counting means is equal to one of 1 and 2.

4. The image reducing apparatus of claim 3 wherein pixels in the 2×2-pixel area and the surrounding area are numbered from "1" to "16" as follows; a left upper pixel in the 2×2-pixel area is numbered "1" and remaining pixels in 2×2-pixel area are numbered from "2" to "4" in an clockwise direction; and a pixel in the surrounding area which is directly above the pixel "1" is numbered "5", and remaining pixels in the surrounding area are numbered from "6" to "16" in a clockwise direction; and wherein the predetermined reference patterns comprises first, second, third, and fourth patterns; the pixels "1" and "2" have the white levels and the pixels "3", "4", "9", "10", and "11" have the black levels in the first pattern; the pixels "1" and "4" have the white levels and the pixels "2", "3", "9", "10", and "11" have the black levels in the second pattern; the pixels "2", "3", "9", "10", and "11" have the white levels and the pixels "1", "4", "14", and "15" have the black levels in the third pattern; and the pixels "3", "4", "9", "10", and "11" have the white levels and the pixels "1", "2", "5", and "6" have the black levels in the fourth pattern.

5. The image reducing apparatus of claim 4 wherein the predetermined reference patterns further comprises fifth, sixth, seventh, and eighth patterns; the pixels "2", "3", and "4" have the white levels and the pixels "1" and "15" have the black levels in the fifth pattern; the pixels "2", "3", and "4" have the white levels and the pixels "1" and "5" have the black levels in the sixth pattern; the pixels "1", "2", and "3" have the white levels and the pixels "4" and "14" have the black levels in the seventh pattern; and the pixels "1", "3", and "4" have the white levels and the pixels "2" and "6" have the black levels in the eighth pattern.

6. The image reducing apparatus of claim 1 wherein the level determining means comprises means for determining the level of the pixel in the reduction-resultant image to be a white level in cases where the black-pixel number counted by the black-pixel counting means is equal to 0; means for determining the level of the pixel in the reduction-resultant image to be a non-white level in cases where the black-pixel number counted by the black-pixel counting means is equal to or greater than a given number; means for changing the non-white level between a black level and a gray level in accordance with the black-pixel number counted by the black-pixel counting means in cases where the black-pixel number counted by the black-pixel counting means is equal to or greater than the given number; means for, in cases where the black-pixel number counted by the black-pixel counting means is in a range of 1 to the given number, determining the level of the pixel in the reduction-resultant image to be the white level when the result of the pattern comparison by the pattern comparing means indicates that the pixel pattern in the N×M-pixel area and the surrounding area disagrees with any of the predetermined reference patterns, and determining the level of the pixel in the reduction-resultant image to be the non-white level when the result of the pattern comparison by the pattern comparing means indicates that the pixel pattern in the N×M-pixel area and the surrounding area agrees with one of the predetermined reference patterns; and means for changing the non-white level between the black level and the gray level in accordance with the black-pixel number counted by the black-pixel counting means in cases where the black-pixel number counted by the black-pixel counting means is in the range of 1 to the given number and where the result of the pattern comparison by the pattern comparing means indicates that the pixel pattern in the N×M-pixel area and the surrounding area agrees with one of the predetermined reference patterns.

7. An image reducing apparatus comprising:
   black-pixel counting means for counting a number of black pixels in an N×M-pixel area in an original image represented by white and black levels, where N and M denote predetermined integers equal to or greater than 2;
   connection-direction extracting means for extracting a direction of a connection of black pixels in the N×M-pixel area, and a direction of a connection of black pixels in an area surrounding the N×M-pixel area;
   black-pixel connection judging means for judging a relation between the direction of the connection of the black pixels in the N×M-pixel area and the direction of the connection of the black pixels in the surrounding area which are extracted by the connection-direction extracting means; and
   level determining means for determining a level of a pixel in a reduction-resultant image in accordance with the black-pixel number counted by the black-pixel counting means and with a result of the relation judgment by the black-pixel connection judging means, the reduction-resultant image pixel corresponding to the N×M-pixel area in the original image.

8. The image reducing apparatus of claim 7 wherein the level determining means comprises means for determining the level of the pixel in the reduction-resultant image to be a white level in cases where the black-pixel number counted by the black-pixel counting means is smaller than a predetermined smaller reference number; means for determining the level of the pixel in the reduction-resultant image to be a non-white level in cases where the black-pixel number counted by the black-pixel counting means is greater than a predetermined greater reference number; means for changing the non-white level between a black level and a gray level in accordance with the black-pixel number counted by the black-pixel counting means in cases where the black-pixel number counted by the black-pixel counting means is greater than the greater reference number; means for, in cases where the black-pixel number counted by the black-pixel counting means is in a range of the smaller reference number to the greater reference number, determining the level of the pixel in the reduction-resultant image to be the non-white level when the result of the relation judgment by the black-pixel connection judging means indicates that the direction of the connection of the black pixels in the N×M-pixel area matches to the direction of the connection of the black pixels in the surrounding area, and determining the level of the pixel in the reduction-resultant image to be the white level when the result of the relation judgment by the black-pixel connection judging means indicates that the direction of the connection of the black pixels in the N×M-pixel area does not match to the direction of the connection of the black pixels in the surrounding area; and means for changing the non-white level between the black level and the gray level in accordance with the black-pixel number counted by the black-pixel counting means in cases where the black-pixel number counted by the black-pixel counting means is in the range of the smaller reference number to the greater reference number and where the result of the relation judgment by the black-pixel connection judging means indicates that the direction of the connection of the black pixels in the N×M-pixel area matches to the direction of the connection of the black pixels in the surrounding area.

9. An image processing apparatus comprising:

means for generating data of a pixel in a first-type frame and data of a pixel in a second-type frame, wherein a position of the pixel in the first-type frame corresponds to a position of the pixel in the second-type frame;

means for indicating the data of the pixel in the first-type frame during a first frame period, indicating the data of the pixel in the first-type frame during a second frame period following the first frame period, and indicating the data of the pixel in the second-type frame during a third frame period following the second frame period;

means for setting both of the data of the pixel in the first-type frame and the data of the pixel in the second-type frame to a white level when a white pixel is indicated by the indicating means;

means for setting the data of the pixel in the first-type frame and the data of the pixel in the second-type frame to the white level and a black level respectively when a light gray pixel is indicated by the indicating means;

means for setting the data of the pixel in the first-type frame and the data of the pixel in the second-type frame to the black level and the white level respectively when a dark gray pixel is indicated by the indicating means; and means for setting both of the data of the pixel in the first-type frame and the data of the pixel in the second-type frame to the black level when a black pixel is indicated by the indicating means.

10. An image reducing apparatus comprising:

black-pixel counting means for counting a number of black pixels in an N×M-pixel area in an original image represented by white and black levels, where N and M denote predetermined integers equal to or greater than 2;

pattern comparing means for comparing a pixel pattern in the N×M-pixel area and an area surrounding the N×M-pixel area with predetermined reference patterns;

first level determining means for determining a level of a pixel in a first-type frame of a reduction-resultant image in accordance with the black-pixel number counted by the black-pixel counting means and with a result of the pattern comparison by the pattern comparing means, the reduction-resultant image pixel corresponding to the N×M-pixel area in the original image;

second level determining means for determining a level of a pixel in a second-type frame of the reduction-resultant image in accordance with the black-pixel number counted by the black-pixel counting means and with the result of the pattern comparison by the pattern comparing means, wherein a position of the pixel in the first-type frame corresponds to a position of the pixel in the second-type frame; and means for indicating the data of the pixel in the first-type frame during a first frame period, indicating the data of the pixel in the first-type frame during a second frame period following the first frame period, and indicating the data of the pixel in the second-type frame during a third frame period following the second frame period;

wherein the first and second level determining means comprises means for setting both of the data of the pixel in the first-type frame and the data of the pixel in the second-type frame to a white level when a white pixel is indicated by the indicating means; means for setting the data of the pixel in the first-type frame and the data of the pixel in the second-type frame to the white level and a black level respectively when a light gray pixel is indicated by the indicating means; means for setting the data of the pixel in the first-type frame and the data of the pixel in the second-type frame to the black level and the white level respectively when a dark gray pixel is indicated by the indicating means; and means for setting both of the data of the pixel in the first-type frame and the data of the pixel in the second-type frame to the black level when a black pixel is indicated by the indicating means.

* * * * *